United States Patent [19]
Tsuruoka

[11] Patent Number: 5,446,733
[45] Date of Patent: Aug. 29, 1995

[54] CONGESTION PROCESSING MODE AND CONGESTION PROCESSING CIRCUIT IN FRAME RELAY EXCHANGE APPARATUS

[75] Inventor: Tetsumei Tsuruoka, Kawasaki, Japan

[73] Assignee: Fujitsu Limited, Kanagawa, Japan

[21] Appl. No.: 191,816

[22] Filed: Feb. 4, 1994

[30] Foreign Application Priority Data

Mar. 22, 1993 [JP] Japan ................................. 5-062083
Sep. 20, 1993 [JP] Japan ................................. 5-233763

[51] Int. Cl.⁶ ............................................. H04L 12/56
[52] U.S. Cl. ..................................... 370/60.1; 370/67; 370/94.2
[58] Field of Search .................. 370/13, 17, 60, 60.1, 370/94.1, 94.2, 67; 371/20.1

[56] References Cited

U.S. PATENT DOCUMENTS

| | | | |
|---|---|---|---|
| 5,142,653 | 8/1992 | Schefts | 370/17 |
| 5,179,549 | 1/1993 | Joos et al. | 370/17 |
| 5,224,091 | 6/1993 | Brandt | 370/17 |
| 5,274,625 | 12/1993 | Derby et al. | 370/17 |
| 5,341,366 | 8/1994 | Soumiya et al. | 370/17 |

Primary Examiner—Wellington Chin

[57] ABSTRACT

A frame relay exchange apparatus which accommodates a plurality of subscriber lines and relay lines and transmits the frames received from these lines to a destination line, constituted so as to measure the amount of communication data for every PVC line along with an elapsed time and so as to calculate the limiting coefficient $\alpha$ varying in accordance with the degree of the queue length of the transmission queue. When the measured amount of communication data exceeds the upper limit value of the terms of subscription of communication of the respective subscribing PVC lines, that upper limit value is changed to a reference value limited by the limiting coefficient $\alpha$, and then a frame discard operation and advance notification are performed. By this, the PVC performing communication within the range of the terms of subscription of communication is protected from unjust limitation from another PVC performing communication exceeding this, while utilizing the resources inside the switching network to the maximum level.

16 Claims, 25 Drawing Sheets

CONGESTION PROCESSING MODE AND CONGESTION PROCESSING CIRCUIT IN FRAME RELAY EXCHANGE APPARATUS

BACKGROUND OF THE INVENTION

1. Field of the Invention

The present invention relates to a congestion processing mode and a circuit thereof used when congestion occurs in a frame relay switching network. More specifically, it relates to a mode and a circuit, as a means of recovery or avoidance of congestion, for performing processing for discarding from the inside of the switching network those frames which can not be completely transferred since the frames in the frame relay switching network are congested or processing for performing notification requesting the reduction of the amount of communication data to related subscribers since the network is in a congested state.

As a technique for data switching between subscribers, there has been conventionally adopted a line switching mode or a packet switching mode.

Recently, however, so as to cope with the demands for high speed data switching, a frame relay switching mode, which is a further revision of the packet switching mode, has been proposed and is now rapidly spreading in use. This frame relay switching mode is a mode in which protocols of flow control and transmission confirmation among the protocols positioned as the layer-2 functions in an open system interface (OSI), which have been carried out for every relay link in the past, are eliminated. Processing is carried out by protocols between subscribers (end - end) in place of this according to need, whereby a great simplification of the protocols in data switching is achieved and high speed data switching is realized. Note that, this mode is being standardized in the CCITT, etc. at present.

As described above, in the frame relay switching mode, flow control is not performed for each link passed through, and therefore when assuming that for example a large number of subscribers simultaneously transmit data (frames) to the switching network, the transmission delay inside the switching network becomes terrible and in the worst case forces some frames to be discarded. In the protocol of the frame relay, as a means of avoiding such a situation, as a rule, it is notified in advance to the related subscribers (line users) that the situation is reaching a congested state, so the subscribers received this notification keep down the amount of the communication data. This discard operation must be carried out from the frames having the lowest importance with a high priority. For this purpose, in a header portion of the frame, information indicating that the data may be discarded is written as a discard eligibility indicator (DE) bit. Also, sometimes it becomes necessary to discard the data exceeding the amount of communication data preliminarily set. At the time of congestion, the discard operation is begun with these frames, whereby the deterioration of the quality of the data is suppressed. Note that, this mechanism has been described in CCITT recommendations I.370.

2. Description of the Related Art

In the control performed with respect to congestion inside a frame relay switching network, where it is judged that congestion occurs by monitoring the congestion of the resources of the network such as the relay lines and exchanges with respect to all assigned connections using the related resources, for example, the subscribers of a permanent virtual circuit (PVC), it is notified in advance that there is a possibility that frames will be discarded and then the discard operation of frames is executed. At this time, as an example of the mechanism of detection of the congestion, there can be mentioned a means for watching the transmission queue of frames mounted to the destination line (usually the relay line) of the frames and, when detecting that the length of the queue becomes greater, judging that congestion occurs.

When the frame discard operation mentioned above is carried out only based on the state of congestion of the resources, for example, where a very small group of the subscribing PVC's (assigned connections) transfer a large amount of frames and occupy a large part of the resources, that is, bands, of the related relay line, other subscribing PVC's which try to use this relay line suffer from a great transfer delay of the frames find their frames discarded even if they try to communicate within a range of the originally committed terms of subscription of communication (committed information rate, committed burst amount, etc.), so the quality of the communication service with respect to these other subscribing PVC's is unjustly lowered.

As processing for eliminating such an inconvenience, it is possible to set the aforesaid DE bits in accordance with the above-described terms of subscription of communication and discard the frames while referring to the DE bits and, therefore, avoid the deterioration of the quality of the communication service described above. However, when doing this, irrespective of the degree of the above-described congestion, if a communication even slightly exceeds the committed terms of subscription of communication, the user will be immediately exposed to the possibility of frame discard, resulting in the problem that the advantage of the frame relay exchange mode that the resources of the switching network are effectively utilized by allowing communication to a certain extent even if the communication exceeds the committed terms of subscription of communication, is decreased or cancelled out.

Also, so as to avoid other PVC's being affected due to the increase of the amount of communication data of a certain specific PVC (assigned connection), consideration may be given to a procedure in which buffers are provided independent for every PVC, but there are problems in that not only does the management of these buffers become complex, but also an excessive amount of memories for forming these buffers become necessary.

SUMMARY OF THE INVENTION

Accordingly, in consideration of the above-described problems, an object of the present invention is to provide a congestion processing mode and circuit which can minimize the limitations suffered by other PVC's communicating within the scope of their original terms of subscription of communication due to the congestion caused by communication by a specific PVC with an excessive amount of data while utilizing the resources inside the frame relay switching network at the maximum level.

To attain the above object, the present invention measures the amount of communication data for every subscribing PVC line along with the elapsed time, calculates a limiting coefficient α which varies in accordance with the degree of the queue length of the transmission queue, and, when the measured amount of communication data exceeds an upper limit value of the terms of subscription of communication of the respective subscribing PVC lines, changes that upper limit value to a reference value limited by the limiting coefficient α, and then performs the frame discard operation and advance notification thereof.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

The embodiments of the present invention will be described next with reference to the related figures.

Figure 1:
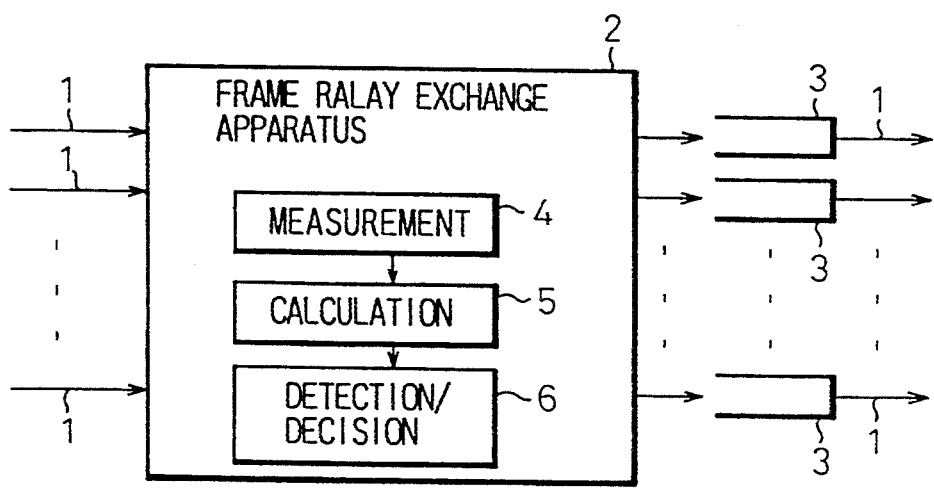
FIG. 1 is a view showing a fundamental structural elements of a mode of the present invention.

FIG. 1 is a view showing fundamental constituent elements of a mode of the present invention. In the figure, reference numeral 2 is a frame relay exchange apparatus which acts as one node among a large number of nodes inside the frame relay switching network. This frame relay exchange apparatus 2 accommodates a plurality of subscriber lines and relay lines 1 and transmits the frames received from these lines to the destination lines. Each destination line 1 is provided with a transmission queue 3.

In the figure, when diagrammatically representing the fundamental constituent elements of the present invention as means, the elements can be represented by a measurement means 4, a calculation means 5, and a detection/decision means 6.

The measurement means 4 individually measures the amount of communication data, for example, for every subscriber permanent virtual circuit (PVC) line along with the elapsed time. Also, the calculation means 5 calculates the limiting coefficient, which is set large or small in accordance with the utilization of the resources to be utilized at the time of transmission processing of the related frames at the point of time where the frames are exchanged at the frame exchange apparatus 2, respectively, along with the elapsed time. As one example of these resources, a transmission line can be mentioned.

The detection/decision means 6 multiplies the above-described limiting coefficient with the upper limit value of the acceptable amount of communication data determined in advance for every subscribing PVC. Based on that limited upper limit value and according to the amount of communication data measured by the above-described measurement means 4 for the related subscribing PVC, it decides whether to discard the frames belonging to the related subscribing PVC or make advance notification of that discard operation. Note that, in general, advance notification of a discard operation is given first with respect to the related subscriber, and then the frames are discarded, but the invention is not restricted to this. It is also possible to just give advance notification or just discard the frames in accordance with the request of the users.

In the frame relay switching network, as mentioned before, even a communication exceeding the amount of communication data set by the terms of subscription of communication is further allowed to a certain extent, but when a specific PVC makes extensive use of this excessive amount of communication data, the other PVC's can not sufficiently utilize the communication exceeding the amount of communication data set by the terms of subscription of communication. Also, if there is a subscribing PVC not reducing the amount of communication data under a situation where the excessive amount of communication data is limited in accordance with the load of the network, to eliminate the inconvenience that the subscribing PVC's reducing the amount of communication data in accordance with the congested situation can not be guaranteed a quality of their data communication compatible with this, in accordance with the degree of congestion of the related transmission line, the acceptable amount of communication data that can be used exceeding the subscribed amount of communication data of the respective subscribing PVC's or the subscribed amount of communication data are dynamically limited. Thus, it is possible to avoid having a common resource such as a transmission line be monopolized by a specific PVC and to have a plurality of line users impartially and efficiently share it. Alternatively, the above-described control is introduced in accordance with the degree of congestion of a resource generally utilized by a plurality of PVC's, not restricted to a transmission line, whereby impartial and efficient band restriction of respective PVC's can be realized in accordance with the congestion of that resource.

Figure 2:
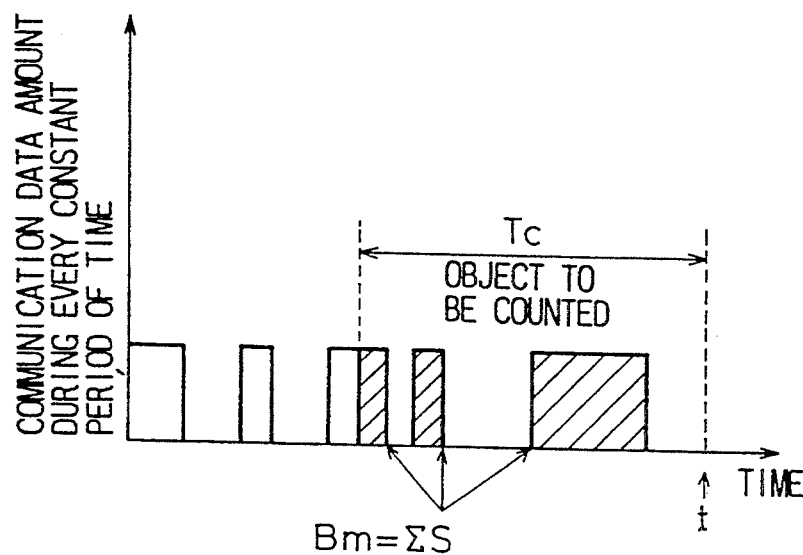
FIG. 2 is a view for explaining a first embodiment of the present invention (part 1)
Figure 3:
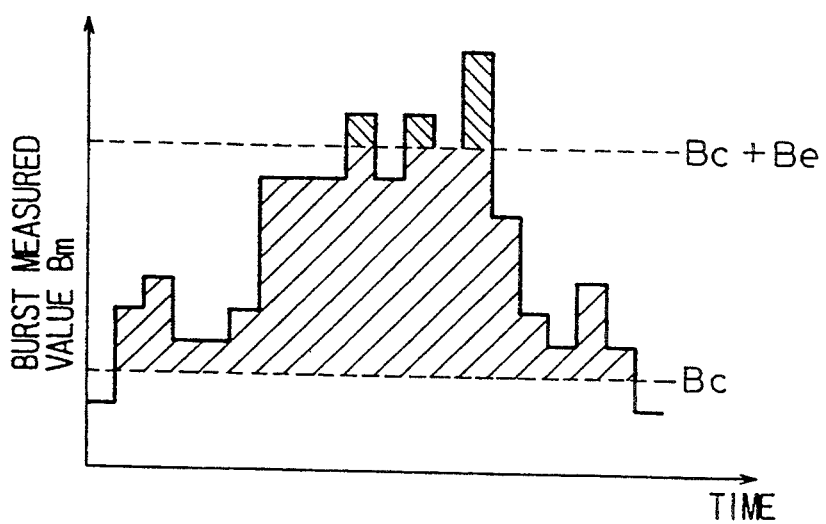
FIG. 3 is a view for explaining the first embodiment of the present invention (part 2)
Figure 4:
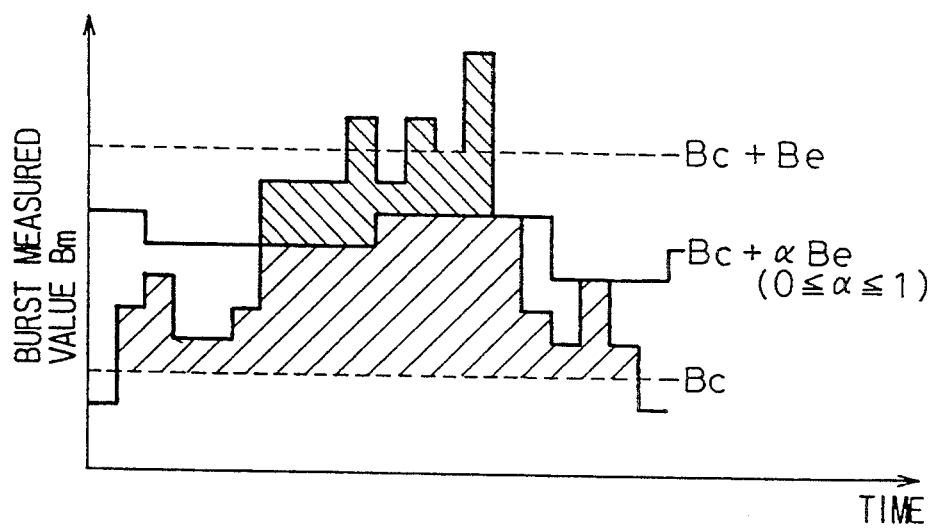
FIG. 4 is a view for explaining the first embodiment of the present invention (part 3)
Figure 5:
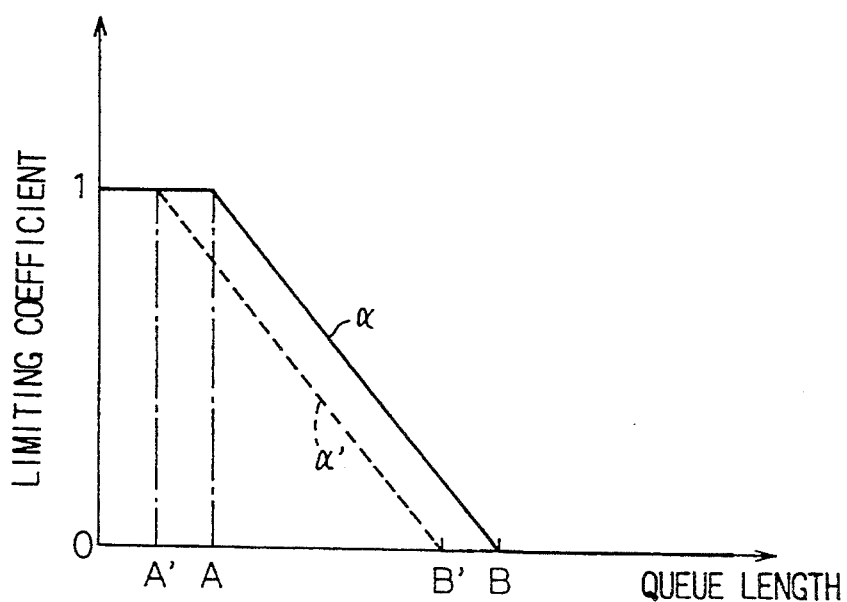
FIG. 5 is a view for explaining a limiting coefficient used in the present invention.
Figure 6:
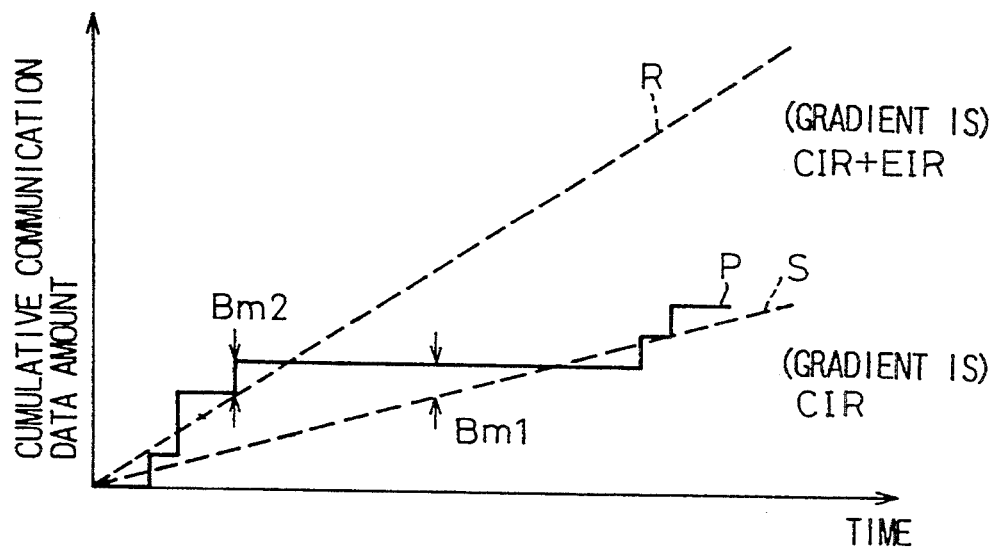
FIG. 6 is a view for explaining a second embodiment of the present invention (part 1)
Figure 7:
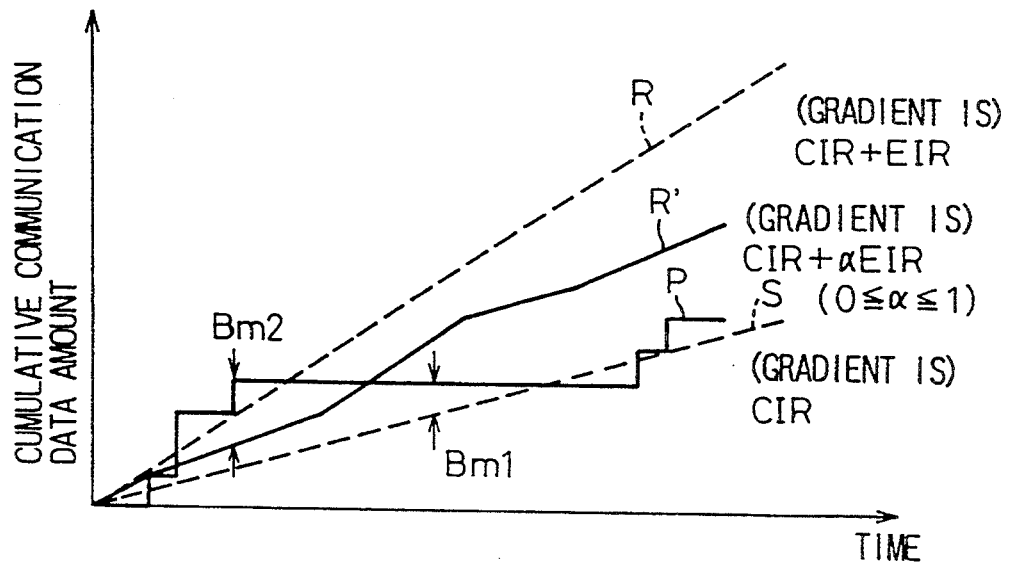
FIG. 7 is a view for explaining the second embodiment of the present invention (part 2)

FIG. 2 is a view for explaining a first embodiment of the present invention (part 1); FIG. 3 is a view for explaining the first embodiment of the present invention (part 2); and FIG. 4 is a view for explaining the first embodiment of the present invention (part 3). Also, FIG. 5 is a view for explaining a limiting coefficient used in the present invention; FIG. 6 is a view for explaining a second embodiment of the present invention (part 1); and FIG. 7 is a view for explaining the second embodiment of the present invention (part 2)

A general description will be made first of the respective embodiments and the minimum matter necessary for understanding them. In the present invention, the first step to determine whether or not each subscribing PVC line is performing communication within the scope of the acceptable amount of communication data. For this purpose, the amount of communication data of every subscribing PVC line must be individually measured along with the elapsed time (corresponding to the above-described measurement means 4). As this measuring method, the following can be considered:

(1) A method of measuring an amount of communication data for every subscribing PVC line by adding cumulatively the amount of communication data of frames transferred onto the respective subscribing PVC lines during every constant time of period, i.e., the so-called sliding window - monitor method (first embodiment) and (2) A method of measuring the amount of communication data for every subscribing PVC line by a difference between the cumulative amount of communication data added every time a frame arrives and the virtual amount of communication data deemed to have been transmitted for every PVC line along with the elapsed time (second embodiment).

On the other hand, in the internal portion of the frame relay exchange apparatus 2, a frame received from a subscribing line or a relay line 1 is transmitted to the transmission line 1 as the destination corresponding to the PVC to which that frame belongs. At this time, where there already exists a frame in the middle of transmission, the data is stored once in the transmission queue 3. This is a general procedure for avoiding the clogging due to communication in progress by enabling reception for sending of another frame even during the transmission of a frame to the line. But when the amount of communication data of the transmission line 1 is increased and the load becomes heavy, the length of that queue is increased by that amount, and also the transmission delay of the frame is increased.

Therefore, in the embodiments, a destination line 1 is assumed as the resource to be utilized, and as guideline showing the degree of that congestion, a function using the queue length in the transmission queue 3 as an argument is used. The value of this function serves as the limiting coefficient for limiting the acceptable amount of communication data. Then, after such a limitation is added, the aforementioned advance notification (congestion notification) of the frame discard operation or the frame discard operation is carried out. As the criterion when these notification and discard operations are executed, the line utilization of the subscribing PVC line to which that frame belongs (magnitude of amount of communication data) is referred to.

For the calculation of this amount of communication data, it is sufficient if the amount of the transmission burst (amount of data of each group when one group of frames are successively transmitted) is referred to. In the first embodiment, the amount of the transmission burst is measured by the sliding window - monitor method. In this case, the amount of communication data per a constant period can be limited by lowering the upper limit value of this burst amount. That is, how much that amount of communication data should be limited is determined in accordance with the congested situation of the resource to be utilized, and the application of limitation of the amount of the transmission burst corresponding to that limiting coefficient is begun from the PVC utilizing the related resource. As a result, the application of limitation is begun from the PVC performing communication at a high rate with respect to the upper limit value of the amount of transmission burst and that limitation is not applied to a PVC with a low line use rate. This means that the line resource is impartially shared.

The upper limit value of the amount of the transmission burst is determined according to the commitments of the respective PVC's, and therefore the upper limit value will vary, but a rate of lowering the upper limit value is obtained as a value, i.e. the limiting coefficient, by evaluating the degree of congestion of the resource being utilized by the related PVC, and it is Judged whether, using the upper limit value of the amount of transmission burst after the limitation by the thus obtained limiting coefficient for every PVC, the transmission burst is to be input into the transmission queue 3, the frame is to be discarded, or the advance notification (congestion notification) of a discard operation is to be carried out. Note that, as the criterion (the above-described upper limit value) when issuing this advance notification of a discard operation, it is sufficient if a value lowered from the criterion (the above-described upper limit value) when performing the discard operation of the related frame by only a predetermined value is used. That predetermined value is appropriately determined according to the use criterion of the user.

Under the above-described first embodiment, for strictly measuring the amount of communication data, it is necessary to hold the history of the data by going upstream to the past by the amount of the measurement time, and the procedure required for the measurement becomes slightly complex, but when the second embodiment is adopted, that measurement procedure is simplified. However, the measurement precision is better in the first embodiment.

The measurement at this second embodiment is described in the above (2). The measurement is carried out by assuming a virtual amount of communication data. Note that, the value utilized in this measurement is a temporary excessive burst data at that point of time, and even though this value is limited, the average working band of the line will not become narrower. For this reason, the burst amount is reduced by exactly an amount of (the elapsed time from a time when one immediately preceding PVC frame is processed)×(virtual transmission rate). In this case, the virtual transmission speed at the time of congestion is lowered with a rate in accordance with the degree of that congestion, to decide whether or not it exceeds the amount of transmission burst, and determine the requirement/nonrequirement of the congestion notification and frame discard operation. This lowering rate is determined by the aforesaid limiting coefficient based on the queue length of the transmission queue 3 in the same way as in the first embodiment.

Where the amount of communication data is controlled under the protocol of the frame relay, generally two amounts of communication data are considered. The first is the guaranteed amount of communication data, and the second is the excessive amount of communication data. The former is the acceptable amount of communication data which is guaranteed to be communicated under the usual terms, and the latter is the acceptable amount of communication data serving as the upper limit for acceptance of communication exceeding the former amount of communication data according to the conditions of the switching network. By this, when the load inside the switching network is light, the data can flow excessively, and the utilization efficiency of the switching network is further increased. Note that, as the acceptable amount of communication data, in for example CCITT recommendation (I.370), the following are determined CIR: committed information rate
EIR: excessive information rate ($=B_e/T_c$)
$B_c$: committed burst amount (corresponding to committed burst size of ANSI T1.606)
$B_e$: excessive burst amount (corresponding to excess burst size of ANSI T1.606)
$T_c$: measuring time ($B_c$/CIR)

When the measured amount of data is equal to or lower than $B_c$, that data must be delivered to the destination without fail if the switching network is in the usual state. The measurement time of this amount of data is the above-described $T_c$. On the other hand, with respect to data exceeding this $B_c$, when it is $B_e$ or less, under the condition that there is enough of a capacity in the switching network, also an excessive amount of data is transferred. If there is not enough capacity, the related frames are treated as data which must be discarded. Further, the frames exceeding $B_e$ are unconditionally discarded taking the safe operation inside the switching network into consideration.

Here, when referring to the previously described FIG. 2 at first, the figure represents the measurement method of the amount of communication data under the first embodiment and indicates a situation in which communication data is generated in a burst-like manner. When these amounts of burst data (S) are cumulatively added ($\Sigma S$) for every constant period $T_c$, the amount of communication data ($B_m = \Sigma S$) on each subscribing PVC line is measured.

For example, the amount of data occurring as in FIG. 2 is cumulatively added along with the elapsed time in the frame exchange apparatus 2, and simultaneously subtracted every time when it is entered into the transmission queue 3. The amount of data therefore varies along with the elapsed time as shown in FIG. 3. During this variation, the amount varying at a level lower than $B_c$ must be guaranteed without fail and must not be discarded.

The communication varying at a level higher than $B_c$ is transferred if there is enough capacity in the switching network by setting the already mentioned DE bit to "1". When there is not enough capacity, it is discarded. The part corresponding to this is the part given the leftward inclined hatching in the figure.

Further, for communication varying exceeding $B_c+B_e$, the already mentioned discard operation is carried out. The part corresponding to this is the part given a rightward inclined hatching in the figure.

The characteristic feature of the present invention under the first embodiment is clearly shown in FIG. 4. $B_c+B_e$ in FIG. 3 is absolutely fixed in level, but this is dynamically altered in accordance with the congestion inside the frame relay switching network. FIG. 4 indicates this. The degree of this variation is determined by the limiting coefficient ($\alpha$) mentioned before. In the end, in one aspect under the first embodiment, the upper limit value of the acceptable amount of communication data determined in advance for every subscribing PVC line is determined by the excessive burst amount ($B_e$), and this is multiplied by the limiting coefficient. In another aspect, the upper limit value is determined by the committed burst amount ($B_c$), and the limiting coefficient is multiplied with this $B_c$.

This limiting coefficient $\alpha$ will be explained in detail with reference to FIG. 5. Where frames are discarded in accordance with the degree of congestion inside the frame relay switching network, the acceptable amount of communication data is dynamically controlled in accordance with the queue length of the transmission queue 3 belonging to the destination transmission line 1. Concretely, a function as shown in FIG. 5 is assumed. When there is room on the transmission line, the queue length is not long. Usually, the operation is performed in a portion shorter than the queue length A, but when the transmission line is congested, that queue length becomes longer. Therefore, when the queue length becomes long exceeding A, the value of $\alpha$ is gradually made smaller. When the queue length exceeds B in the figure, the degree of congestion is extremely large, and thus $\alpha$ is made "0". That is, an excessive burst amount is never admitted.

The above-described operation performs, when processing for frame relay exchange for example, also the measurement of the amount of communication data of the PVC to which that frame belongs and further inquires about the destination and refers to the queue length of that transmission queue, decides whether it is within a range of the amount of communication data to be used by that PVC, and when it is out of that range, applies a limit in accordance with that $\alpha$.

Note that, in FIG. 5, the dotted line function $\alpha'$ is the threshold level used when the advance notification (congestion notification) of frame discard already mentioned is carried out. It changes at the position where a slight excess capacity is estimated relative to the function $\alpha$ (a weaker limitation than the limiting coefficient $\alpha$ is applied).

Common to the above-described first embodiment and the second embodiment mentioned later, as the parameter when calculating the limiting coefficient, other than the queue length of the transmission queue 3, it is also possible to include the transmission rate of the line to which the related transmission queue belongs. That is, when the transmission rate is high, the delay is reduced by that amount, and therefore the point A and point B of the function $\alpha$ of FIG. 5 can be shifted to a slightly right side from the illustrated point. Conversely, if it is low, it can be shifted to the left side.

Moreover, it is not necessary that the limiting coefficient $\alpha$ representing a certain function be simply a linear function. It is also possible to set the same to be more complicated. In this case, it is also possible to hold that complicated function in a ROM (mentioned later), access that ROM using the queue length as an address, and read out the optimum limiting coefficient from the ROM.

Thus, an acceptable amount of communication data as shown in FIG. 4, which is dynamically regulated according to $\alpha$ varying along with the elapsed time, is realized. In this case, the degree of exertion of the limitation by $\alpha$ is proportional to the degree of utilization of $B_e$ (or $B_c$), and the PVC utilizing the line a larger amount is subjected to a stronger control.

In the above-described first aspect of the first embodiment, the limiting coefficient ($\alpha$) was made to act only upon $B_e$ (only upon $B_c$ in the above-described other aspect), but further, in addition, it is also possible to apply the limiting coefficient upon both of $B_e$ and $B_c$. When generally representing this, as the upper limit value of the acceptable amount of communication data determined in advance for every subscribing PVC line, two different types of the first upper limit value and second upper limit value are set, the first upper limit value is determined by the excessive burst amount $B_e$, and the second upper limit value is determined by the committed burst amount $B_c$. When performing this, the effect of limitation at the time of congestion becomes stronger. For this, one example will be explained by FIG. 12 and FIG. 13 mentioned later.

An explanation will be made next of the second embodiment. In this second embodiment, the upper limit value of the acceptable amount of communication data determined in advance for every subscribing PVC line is determined using the excessive information rate (EIR) as the criterion and, at the same time, the amount of communication data for every subscribing PVC line is measured by the difference between the cumulative amount of communication data added every time a frame arrives and the virtual amount of communication data deemed to have been transmitted for every PVC line along with the elapsed time.

When referring to FIG. 6 at first, the cumulative amount of communication data changes step-wise at every arrival of a frame as indicated by for example P of the figure. On the other hand, when assuming that communication is being carried out at the level of the already mentioned committed information rate (CIR), the virtual amount of communication data deemed to have been transmitted to the related subscribing PVC line along with the elapsed time changes as S in the figure. Similarly, when assuming that the communication is being carried out at the already mentioned EIR level, the virtual amount of communication data deemed to have been transmitted to the related subscribing PVC line along with the elapsed time changes as R in the figure. In this case, the part of $B_m1$ in FIG. 6 corresponds to the part of the leftward inclined hatching of FIG. 3; and the part of $B_m2$ in FIG. 6 corresponds to the part of the rightward inclined hatching of FIG. 3. It is FIG. 7 which considers a limiting coefficient $\alpha$ with respect to such a change of the data transmission, and in which the level of CIR+EIR which has been conventionally fixed dynamically varies according to $\alpha$ varying along with the elapsed time as CIR+$\alpha$EIR. This FIG. 7 corresponds to the aforementioned FIG. 4.

Thus, for a PVC line having a large amount of communication data, the data transmission is carried out in a state receiving the limitation as R' in FIG. 7.

Note that, although an example of multiplying the limiting coefficient $\alpha$ only with EIR was indicated, it is also possible to multiply another limiting coefficient with CIR. That is, as the upper limit value of the acceptable amount of communication data determined in advance for every subscribing PVC line, two different types of the first upper limit value and second upper limit value are set, the first upper limit value is determined using the excessive information rate (EIR) as the criterion, and the second upper limit value is determined using the committed information rate (CIR) as the criterion. When performing this, the effect of limitation at the time of congestion becomes stronger. For this, one example will be explained by FIG. 14 and FIG. 15 mentioned later.

Figure 8:
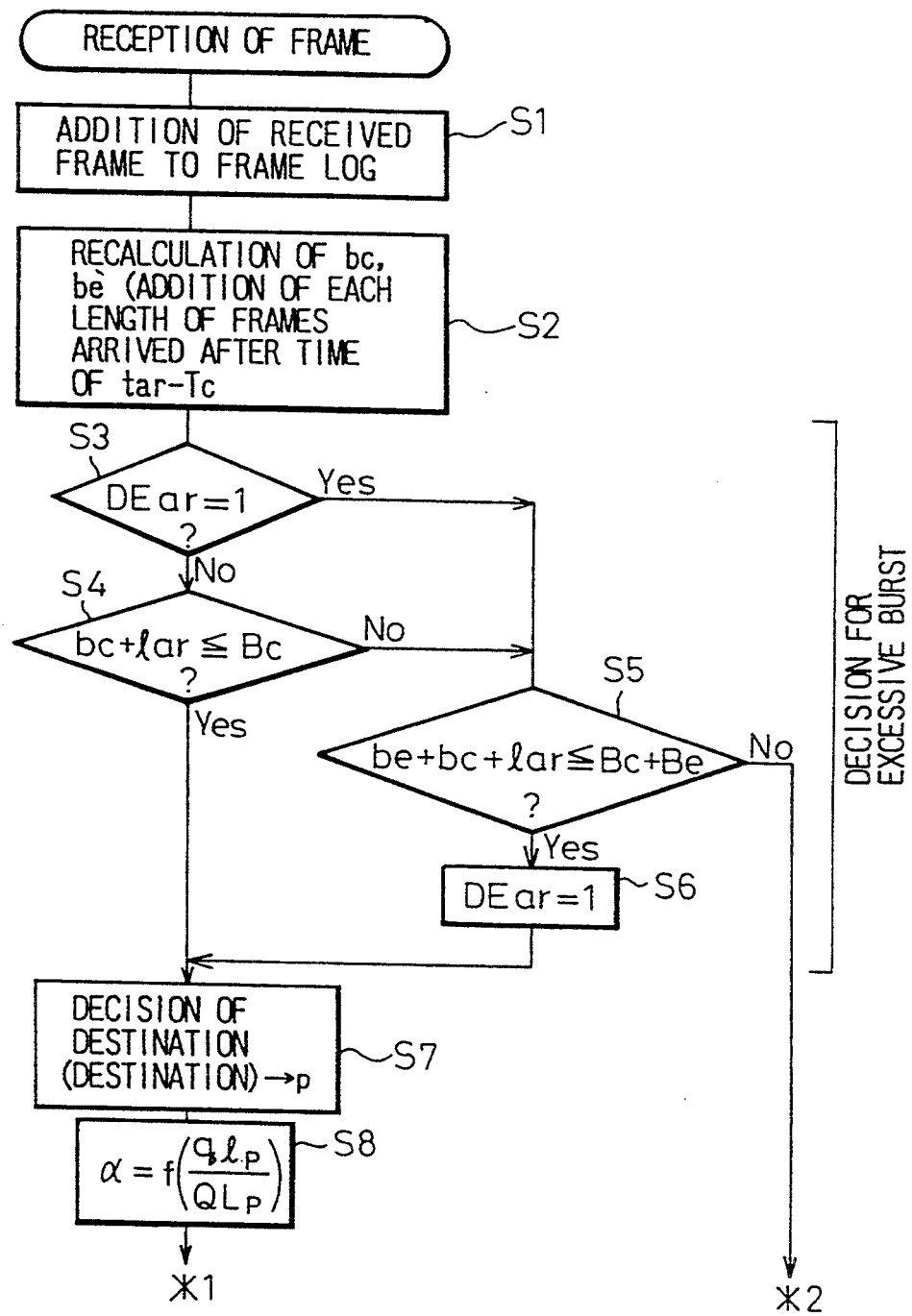
FIG. 8 is a flow chart showing one example of an operation based on the first embodiment of the present invention (part 1)
Figure 9:
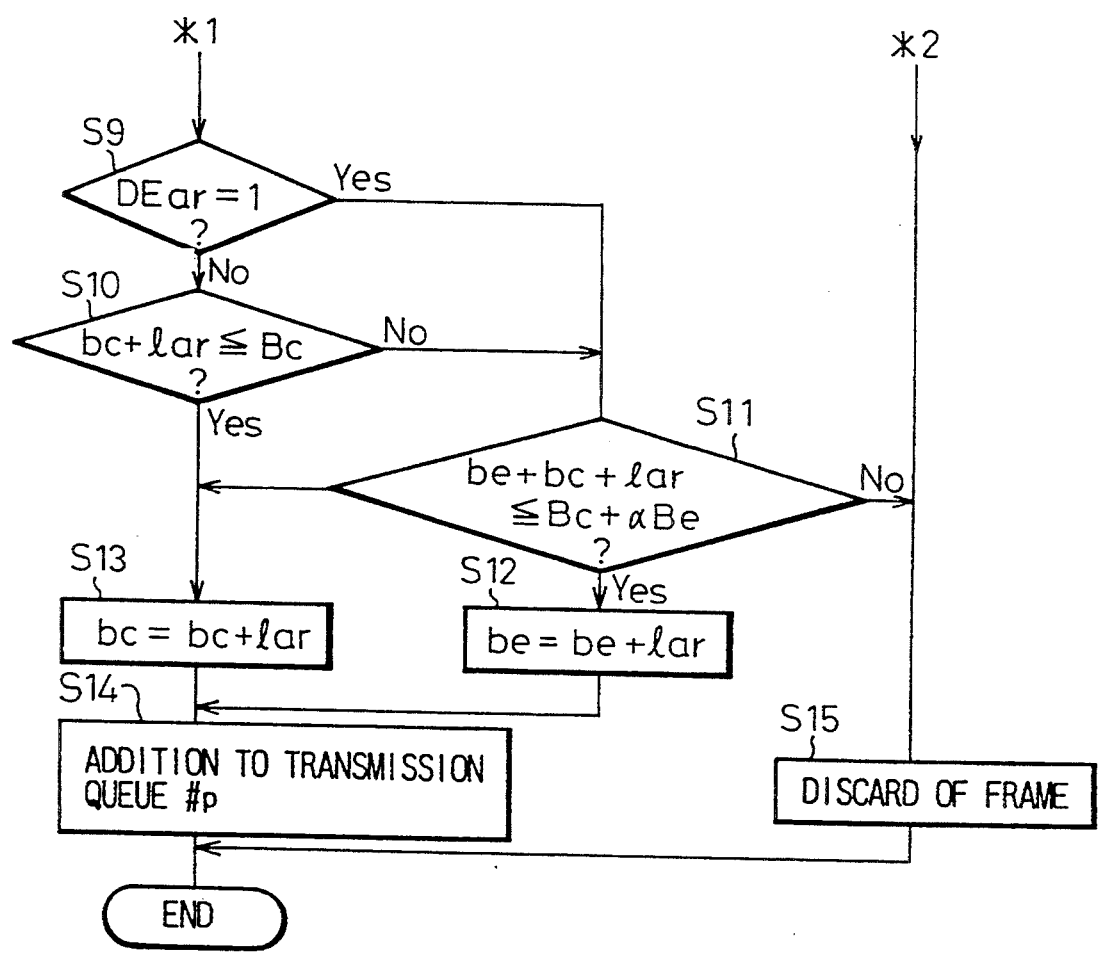
FIG. 9 is a flow chart showing one example of the operation based on the first embodiment of the present invention (part 2)
Figure 10:
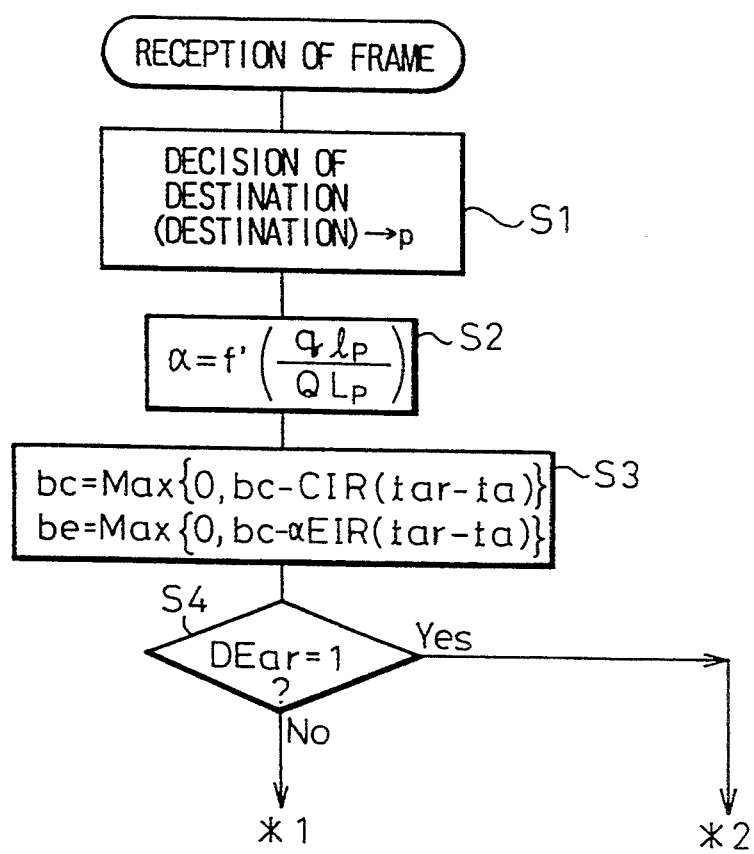
FIG. 10 is flow chart showing one example of the operation based on the second embodiment of the present invention (part 1)
Figure 11:
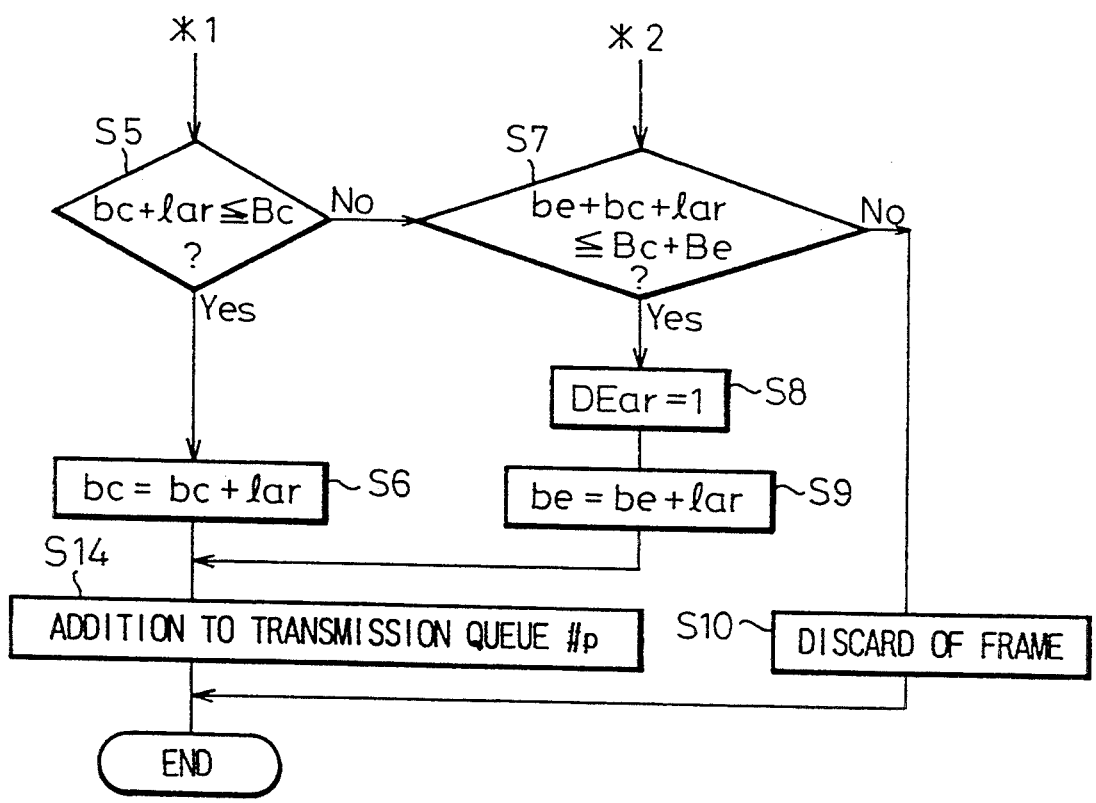
FIG. 11 is a flow chart showing one example of the operation based on the second embodiment of the present invention (part 2)
Figure 12:
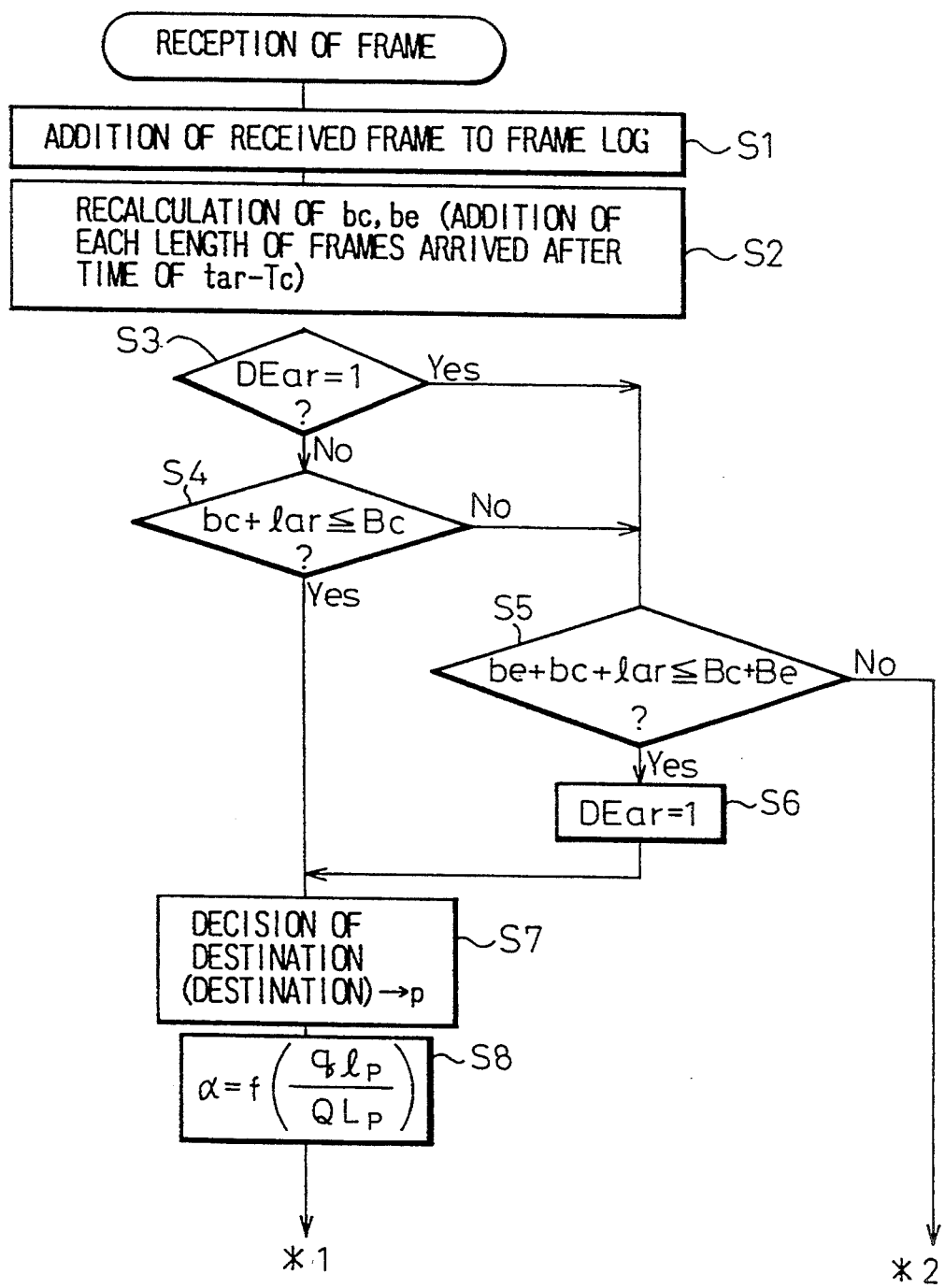
FIG. 12 is a flow chart showing another example of the operation based on the first embodiment of the present invention (part 1)
Figure 13:
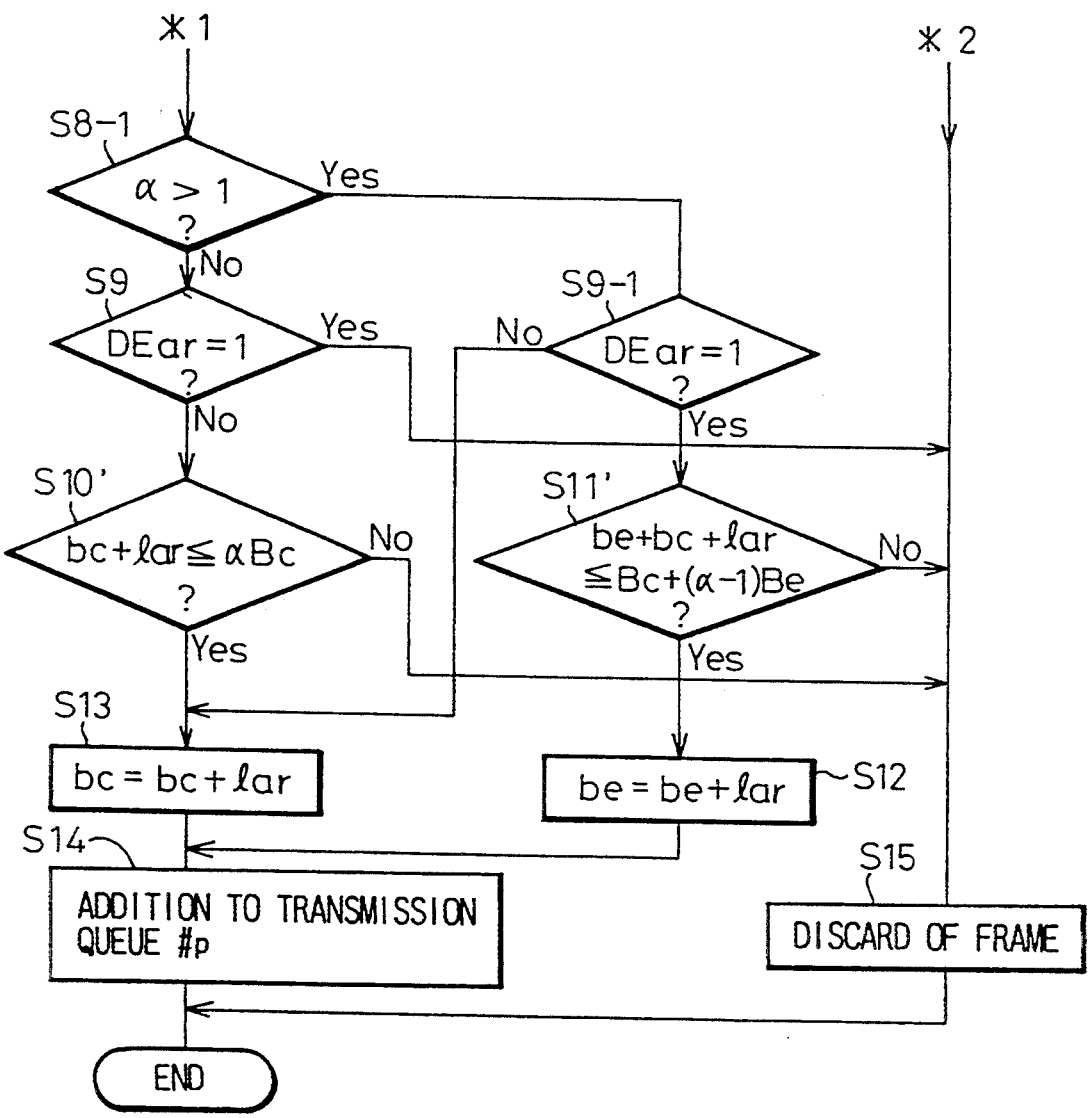
FIG. 13 is a flow chart showing another example of the operation based on the first embodiment of the present invention (part 2)
Figure 14:
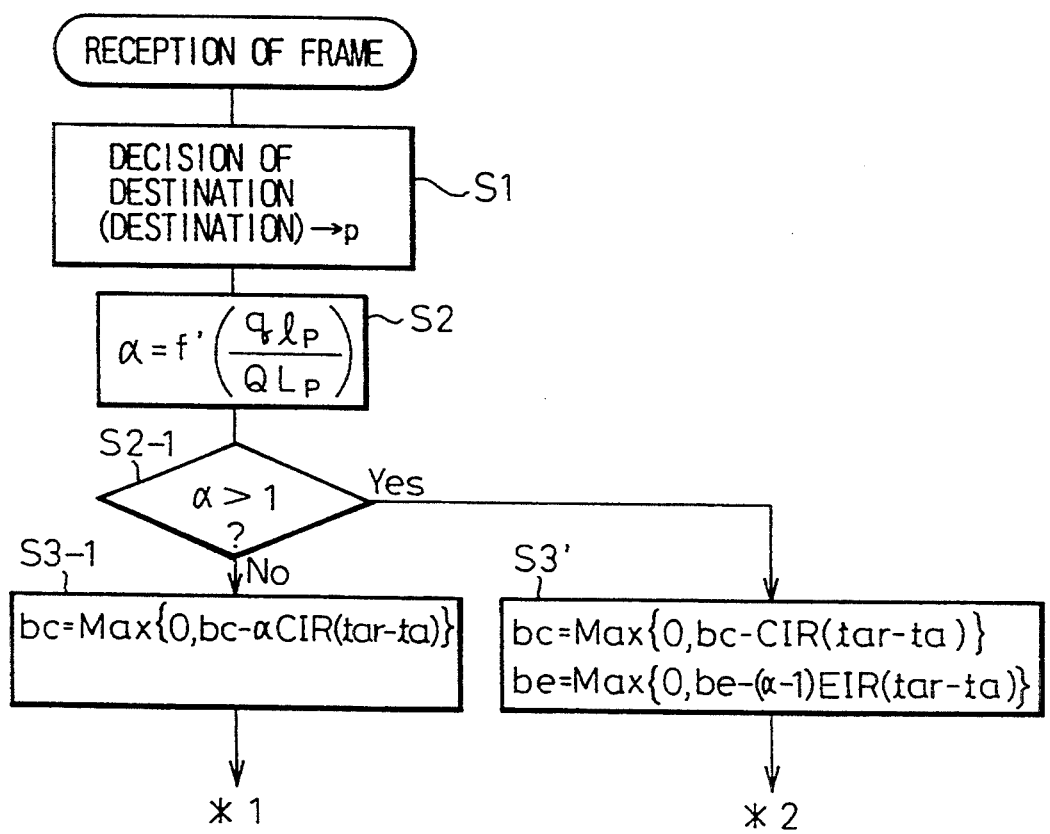
FIG. 14 is a flow chart showing another example of the operation based on the second embodiment of the present invention (part 1)
Figure 15:
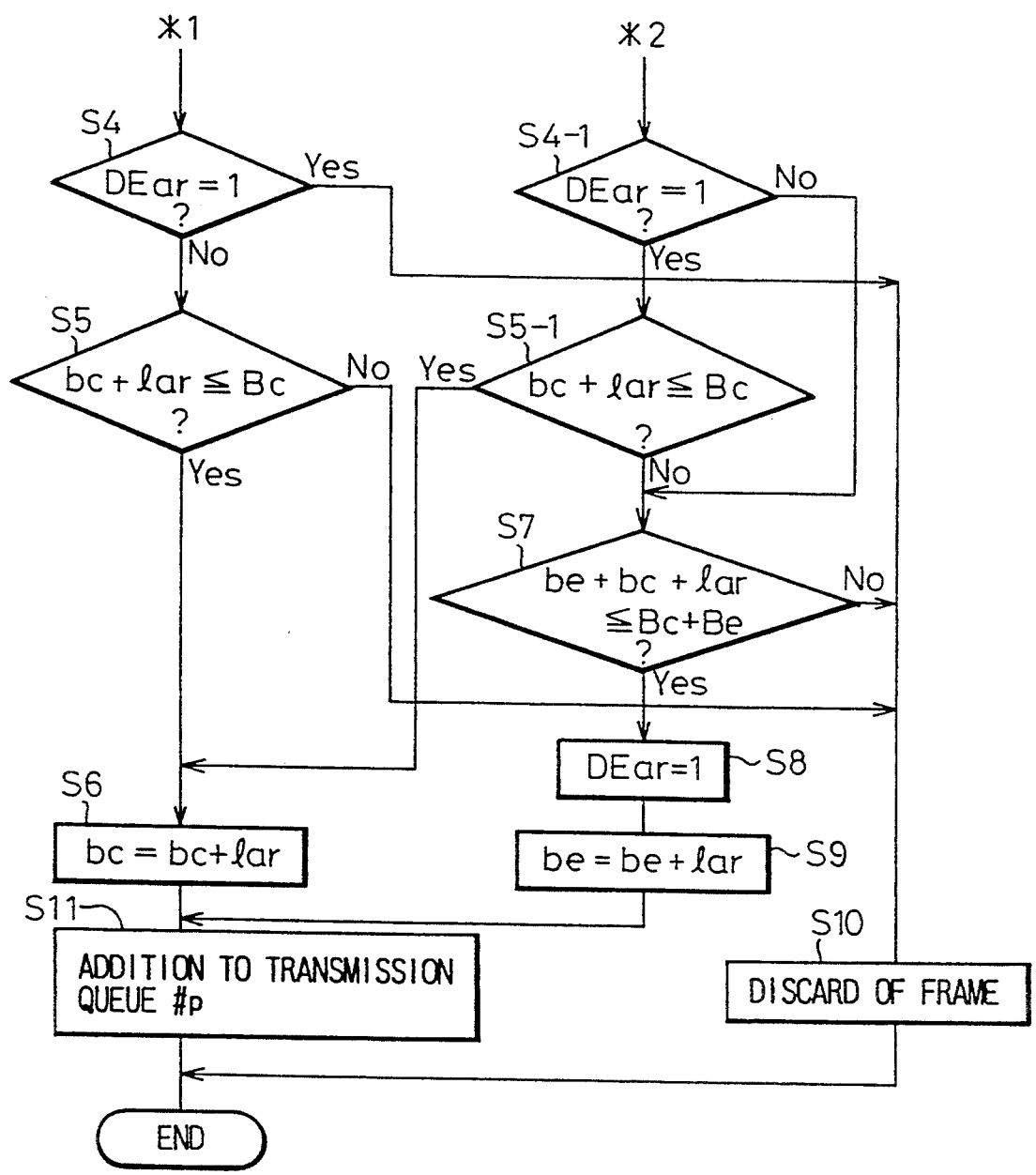
FIG. 15 is a flow chart showing another example of the operation based on the second embodiment of the present invention (part 2)

FIG. 8 is a flow chart showing one example of the operation based on the first embodiment of the present invention (part 1); and FIG. 9 is a flow chart showing one example of the operation based on the first embodiment of the present invention (part 2). Also, FIG. 10 is a flow chart showing one example of the operation based on the second embodiment of the present invention (part 1); and FIG. 11 is a flow chart showing one example of the operation based on the second embodiment of the present invention (part 2). Further, FIG. 12 is a flow chart showing another example of the operation based on the first embodiment of the present invention (part 1); FIG. 13 is a flow chart showing another example of the operation based on the first embodiment of the present invention (part 2); FIG. 14 is a flow chart showing another example of the operation based on the second embodiment of the present invention (part 1); and FIG. 15 is a flow chart showing another example of the operation based on the second embodiment of the present invention (part 2).

Referring to FIG. 8 and FIG. 9, when the frame is received in the frame relay exchange apparatus 2, the received frames are stored in a frame log which is the predetermined memory area (S1).

$b_c$ and $b_e$ are renewed by recalculation (S2). Note that, $b_c$ represents the measured burst amount (within a range of already mentioned $B_c$), and $b_e$ represents the measured burst amount (within a range of already mentioned $B_e$). Also, $T_c$ is indicated in the previously mentioned FIG. 2.

It is checked whether or not the DE bit of the frame arriving at step S3 is "1". When DE="0" (discard is not allowed), the routine proceeds to step S4. Here, it is checked whether the sum of the frame length $l_{ar}$ of the arrival frame and $b_c$ does not exceed $B_c$, that is, whether it does not intrude into the leftward inclined hatching of FIG. 3.

In both of the case where the result of step S3 is No and the result of step S4 is No, or the case where the result of step S is Yes, the routine proceeds to step S5, at which a decision considering also the excessive burst amount is carried out. When the result thereof is No, the related frame is discarded (S15). Conversely, if it is Yes, the DE bit is rewritten to "1", and altered to the frame that can be discarded (S6).

At step S7, the destination thereof is further inspected by the header of the arrived frame to obtain p. When performing this, it is seen that it is sufficient if the data is sent to the transmission queue (p) (transmission queue #p) belonging to the transmission line p.

Therefore, the limiting coefficient $\alpha$ regarding that transmission queue #p is sought. $\alpha$ is determined as the function of for example $ql_p/QL_p$. Note that, the present queue length $ql_p$ is normalized by the maximum length $QL_p$ of the related transmission queue #p. Also, this function is a polygonal line state primary function according to the example of FIG. 5.

At step S9, when the DE bit is not "1" (No), this frame can not be discarded, and when it is confirmed at step S10 that the DE bit is in an area not more than $B_c$, the routine proceeds to step S13, where $b_c$ is renewed as $b_c+l_{ar}$.

When the result of step S9 is Yes (frame discard is allowed) while No at step S10 (the data is in the leftward inclined hatching area of FIG. 3), the routine reaches step S11 in any case, and it is determined whether or not the frame can be entered into the transmission queue #p further taking the excessive amount into consideration. At this time, the limiting coefficient $\alpha$ at step S8 acts upon $B_e$. $\alpha$ is represented as $0 \leq \alpha \leq 1$, and $B_e$ of the PVC which is now passing a large amount of data, is controlled in accordance with the degree of congestion of the transmission queue #p.

At step S12, $b_e$ is renewed as $b_e+l_{ar}$, and the related frame is entered into the transmission queue #p (S14).

Next, referring to FIG. 10 and FIG. 11, when the frame is received at the frame relay exchange apparatus 2, first, at step S1, the transmission queue #p is checked by the header of that frame.

Further, the limiting coefficient $\alpha$ is sought (S2). This is the same as S8 of FIG. 8, but the function is changed to f', which is discriminated from the function f in the case of S8.

At step S3, $b_c$ and $b_e$ are renewed by recalculation, and here, as Max, a larger one is selected from the inside of the subsequent parentheses ({ }). "0" is selected for $b_c$ when the data amount P is less than the value of the straight line S in FIG. 7. Also, "0" is selected for $b_e$ when the data amount P is less than the value of the line R' in FIG. 7. In this case, $t_{ar}$ is the arrival time of the frame which now arrives, and $t_a$ is the arrival time of the frame which arrived immediately before that time. Accordingly, CIR $(t_{ar}-t_a)$ is the virtual amount of communication data deemed to have been transmitted after this elapsed time.

Step S4 and subsequent steps are almost the same as the step S9 and subsequent steps explained in FIG. 9. Note, contrary to step S11 of FIG. 9 in which the limiting coefficient $\alpha$ is taken into account, at step S7 of FIG. 11 corresponding to this, this is not taken into account. This is because it has been already considered at step S3 of FIG. 10. Also, step S8 follows immediately after step S7 of FIG. 11, but in FIG. 9, there is no step corresponding to this S8. This is because the processing has been already performed at step S6 of FIG. 8.

Referring to FIG. 12 and FIG. 13, this example of operation is that where the limiting coefficient $\alpha$ acts not only on the excessive burst amount $B_e$, but also on the committed burst amount $B_c$ as mentioned previously. Accordingly, as $\alpha$ in this case, preferably $0 \leq \alpha \leq 2$ is set, and two-step control is carried out as in FIG. 16. It is OK if $\alpha$ of this FIG. 16 is considered to be one obtained by cumulatively adding $\alpha$ by two steps.

Most of all of the steps of FIG. 12 and FIG. 13 are the same as the steps of FIG. 8 and FIG. 9 or similar to the latter. The same step numbers (S1, S2, etc.) are attached to the same steps, while similar steps are indicated by adding apostrophe marks to the corresponding step numbers (for example S10'). Steps to be added are indicated by adding a hyphened number to a nearby step number (for example, S8-1), respectively.

Figure 16:
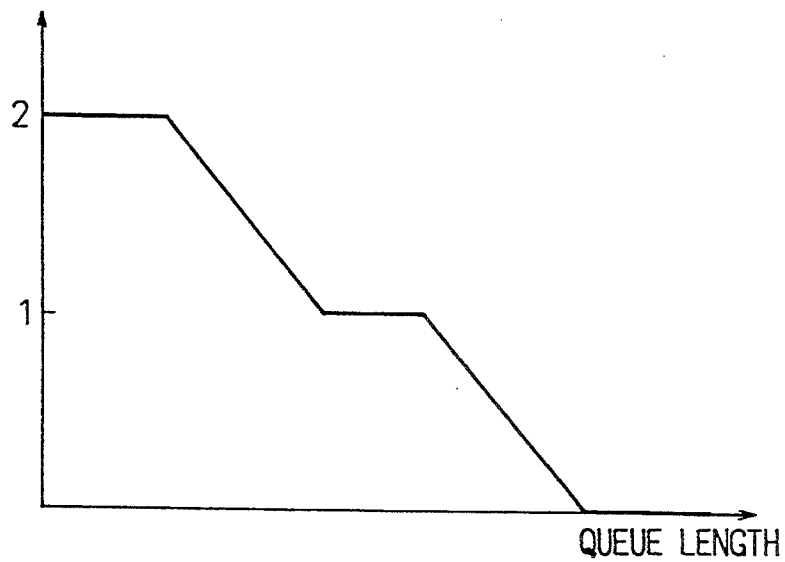
FIG. 16 is a view showing another example of the limiting coefficient α.

When it is seen that $\alpha > 1$ at step S8-1 of FIG. 13, this time is a time when the queue length is shorter than the case of FIG. 16, and $\alpha$ act only upon $B_e$ as $\alpha-1$ in the same way as in the first embodiment, but when it is seen that $\alpha$ is not larger than 1, at this time, it is not enough if only $B_e$ is limited, i.e. the queue length is long, and a limitation is further applied also to $B_c$.

Most of all of the steps of also FIG. 14 and FIG. 15 are the same as the steps of FIG. 10 and FIG. 11 or similar to the latter. The same step numbers (S1, S2, etc.) are attached to the same steps, while similar steps are indicated by adding apostrophes to corresponding step numbers (for example S3'). Steps to be added are indicated by adding a hyphened number to a nearby step number (for example, S2 - 1), respectively. Also, as the limiting coefficient $\alpha$ of FIG. 14 and FIG. 15, $\alpha$ of FIG. 16 is used.

When it is seen that $a > 1$ at step S2-1 of FIG. 14, $\alpha$ acts upon EIR as $\alpha-1$ (step S3') to limit this. If the queue length does not become short even in this case and when $\alpha$ becomes smaller than 1, $\alpha$ further acts upon CIR (step S3-1).

Figure 17:
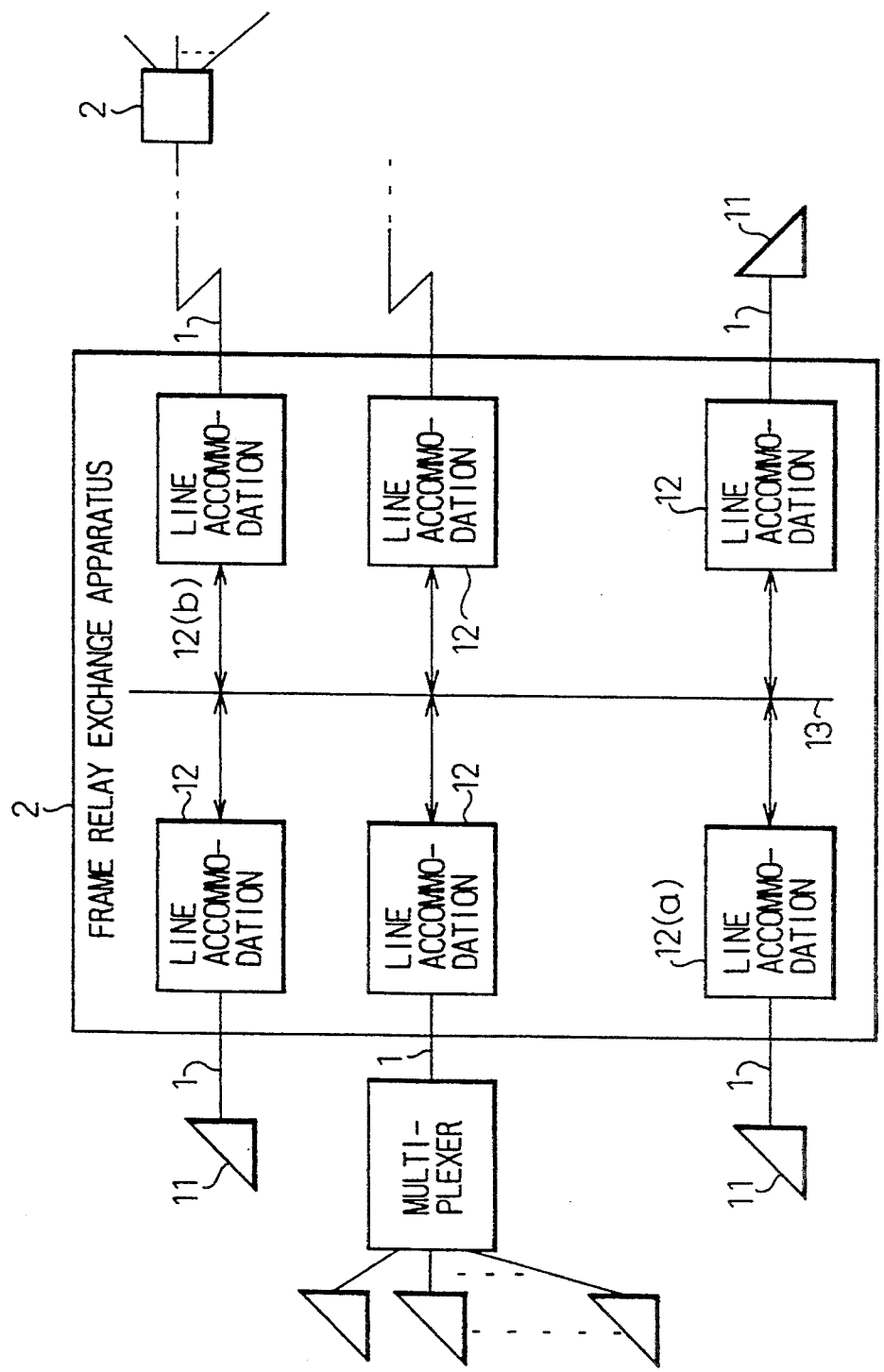
FIG. 17 is a view showing one example of a switching network to which the mode of the present invention is applied.

FIG. 17 is a view showing one example of a frame relay switching network to which the mode of the present invention is applied. At the center of the figure, the frame relay exchange apparatus 2 indicated in FIG. 1 is shown, which is connected via the respective lines 1 to the other similar frame relay exchange apparatuses 2' and the subscriber terminals 11. The line 1 connected to the subscriber terminal is the subscriber line, and the line 1 connected to other frame relay exchange apparatus 2' is the relay line.

Each frame relay exchange apparatus 2 is constituted by a plurality of line accommodation units 12 corresponding to respective lines and a common bus 13 interconnecting these line accommodation units 12. For example, where the terminal 11 indicated at the left bottom in the figure and another frame relay exchange apparatus 2' indicated at the right top in the figure are connected, the frame transfer is carried out between the line accommodation unit 12(a) and line accommodation unit 12(b) in the figure via the common bus 13.

Figure 18:
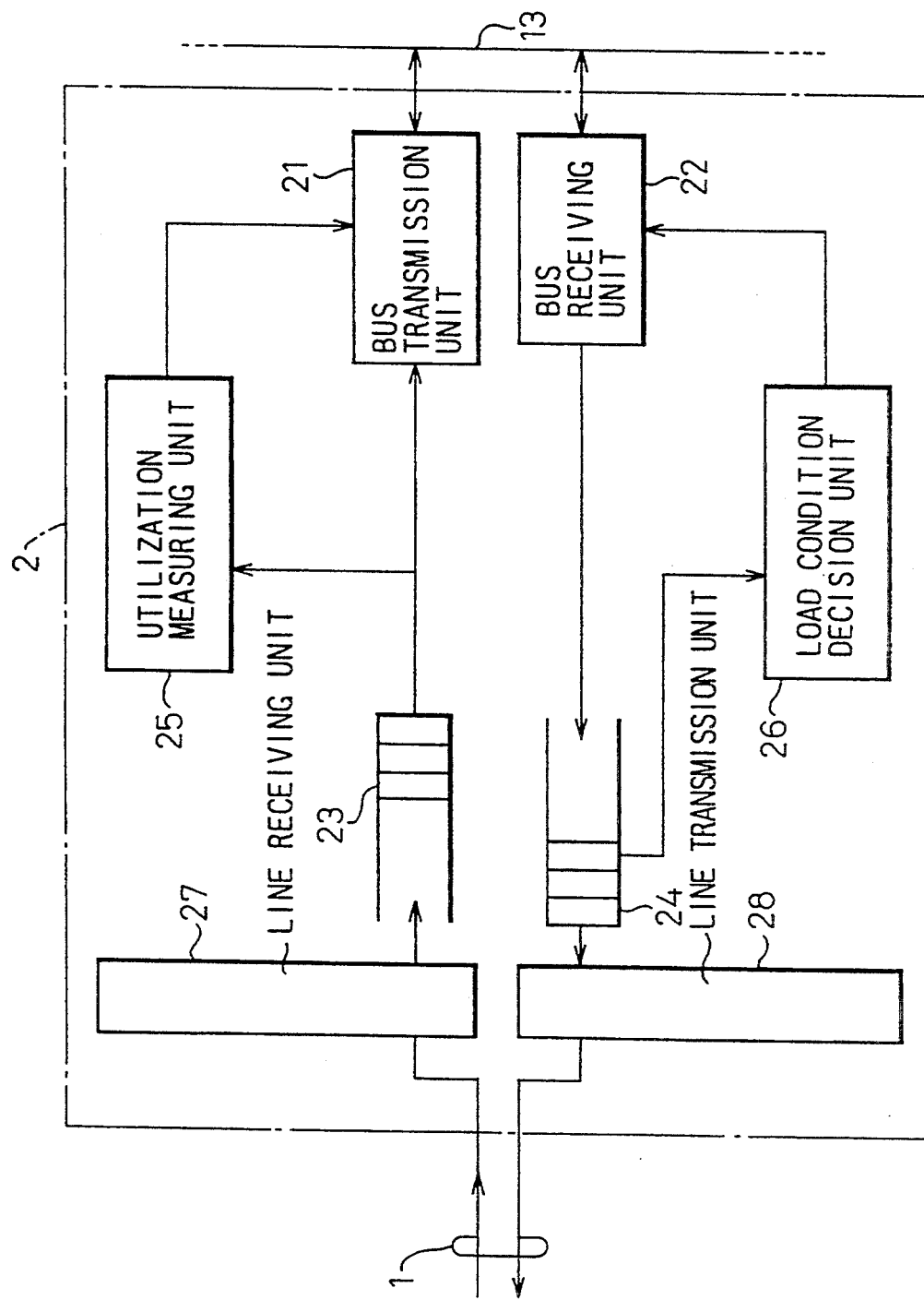
FIG. 18 is a view representing a fundamental structure of a line accommodation unit.

FIG. 18 is a view representing the fundamental structure of the line accommodation unit.

Each line accommodation unit 12 is constituted mainly by a bus transmission unit 21 which outputs a frame to a common bus 13; a bus receiving unit 22 which receives as its input the frame from the common bus 13; a receiving buffer 23 which temporarily stores the frames received from the corresponding line 1 and outputs the same to a bus transmission unit 21; and a transmission buffer 24 which temporarily stores the frames input via the bus receiving unit 22 and transmits the same to the corresponding line 1. Note that 27 and 28 are a line receiving unit and line transmission unit serving as the line interface with respect to the corresponding line 1. The bus transmission unit 21 and the bus receiving unit 22 serve as the interface with respect to the common bus 13 and perform the assembly of the frame to be transmitted to the common bus 13 and extraction of the data part etc. from a frame received from the common bus 13.

Here, a congestion processing circuit according to the present invention is constituted by mainly including a utilization measuring unit 25 and a load condition decision unit 26.

The utilization measuring unit 25 monitors the frame output from the receiving buffer 23, individually measures the amount of communication data of every PVC line along with the elapsed time, calculates the amount of communication data introducing the limiting coefficients ($\alpha$, $\alpha'$) determined in accordance with the magnitude of transmission load of the line accommodation unit 12 corresponding to the destination line of that frame, and controls the transmission of the frame from the bus transmission unit 21 in accordance with that calculated amount of communication data.

The load condition decision unit 26 monitors the amount of communication data of frames input and output to and from the transmission buffer 24, generates limiting coefficients ($\alpha$, $\alpha'$), and supplies the generated limiting coefficients ($\alpha$, $\alpha'$) via the common bus 13 to the utilization measuring unit (25) inside another line accommodation unit (it is indicated by for example 12(b)) which intends to perform the transmission of the frame using the related line accommodation unit (it is indicated by for example 12(a)) as the destination line.

Accordingly, the above-described limiting coefficients used by the above-described utilization measuring unit 25 is given via the common bus 13 from the load condition decision unit inside the above-described other line accommodation unit 12(b) every time when a reception frame is generated.

Figure 19:
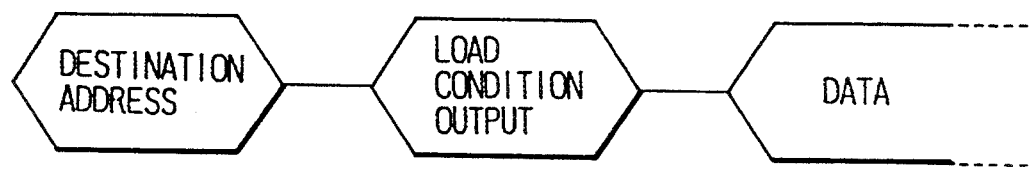
FIG. 19 is a view showing a fundamental bus sequence when a frame is transmitted.

FIG. 19 is a view showing a fundamental bus sequence at the time of the frame transfer. For example, where the frame is to be transferred from the line accommodation unit 12(a) of FIG. 17 to the line accommodation unit 12(b), first, from the bus transmission unit 21 of the line accommodation unit 12(a) obtaining the bus accessing right of the common bus 13, preceding the transmission of the frame, a "destination address", that is, an address of the line accommodation unit 12(b) inside the frame relay exchange apparatus 2 is output to the common bus 13.

The destination line accommodation unit 12(b) specified by this destination address outputs the above-described limiting coefficients from its own load condition decision unit 26 through its own bus receiving unit 22 ("load condition output" in the figure). These limiting coefficients are received through the bus transmission unit 21 of the line accommodation unit 12(a) which is the origination of transfer via the common bus 13, compares the same with the utilization of the frame which is now going to be transferred (measured by the utilization measuring unit 25), and decides whether that frame can be transferred. If possible, subsequently the data transfer phase of the frame is entered ("data" in the figure). If impossible, a frame discard operation is carried out (at this time, the part of "data" in the figure does not exist).

Figure 20:
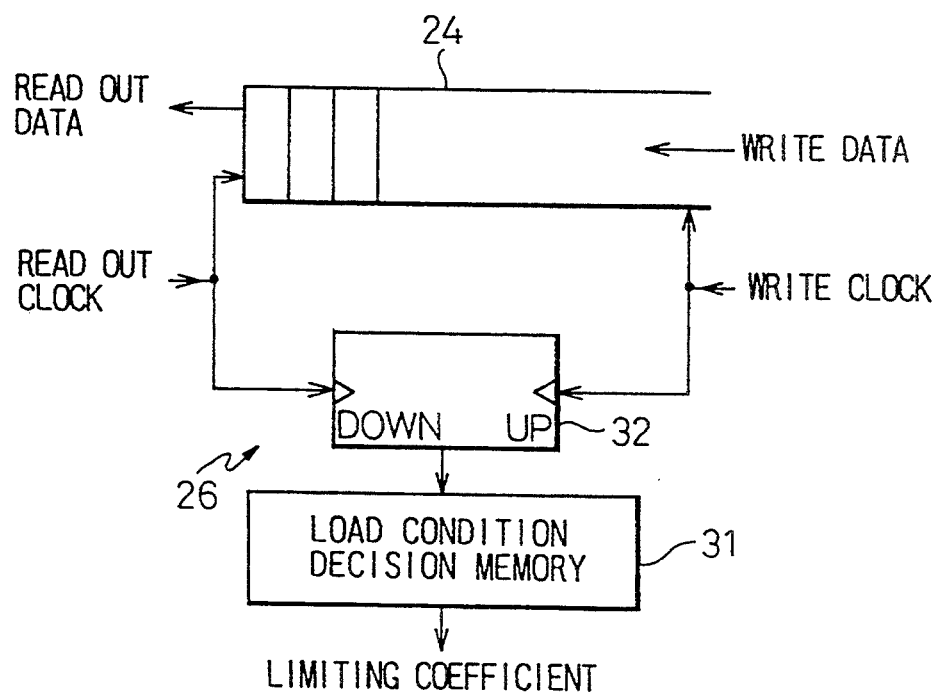
FIG. 20 is a view showing a concrete example of a load condition determining unit.

FIG. 20 is a view showing a concrete example of the load condition decision unit. As illustrated, the load condition decision unit 26 is provided with a load condition decision memory 31 which holds the limiting coefficients corresponding to the amounts of communication data stored in the transmission buffer 24 in the form of a table. This memory 31 is for example a ROM. As the limiting coefficients thereof, the already mentioned $\alpha$ and $\alpha'$ are held (refer to FIG. 5 and FIG. 16).

The amount of communication data (number of stored bytes) stored in the transmission buffer 24 can be detected by for example the up/down counter 32. The counter 32 increments that counted value every time when the write data is entered into the transmission buffer 24 by the write clock, while decrements that counted value every time when it is discharged from the buffer 24 as the read out data by the read out clock, the memory 31 is accessed using the thus obtained output of the up/down counter 32, that is, the number of the stored bytes as an address, and the corresponding limiting coefficient is read out.

The write clock and read out clock were used because a case where an FIFO (First-In-First-Out) type memory was used as the transmission buffer 24 (the same also for the receiving buffer 23) was taken as an example. Note that, it is also possible to realize the transmission buffer 24 (the same also for the receiving buffer 23) using a usual memory performing a write-/read out operation by a write pointer and read out pointer.

In the example of FIG. 20, the limiting coefficient is to be obtained by catching the number of stored bytes inside the transmission buffer 24 instant by instant, but it is also possible to smooth that number of stored bytes through a low-pass filter, and then obtain the limiting coefficient thereof. By doing this, a limiting coefficient taking a time history into account can be obtained.

Figure 21:
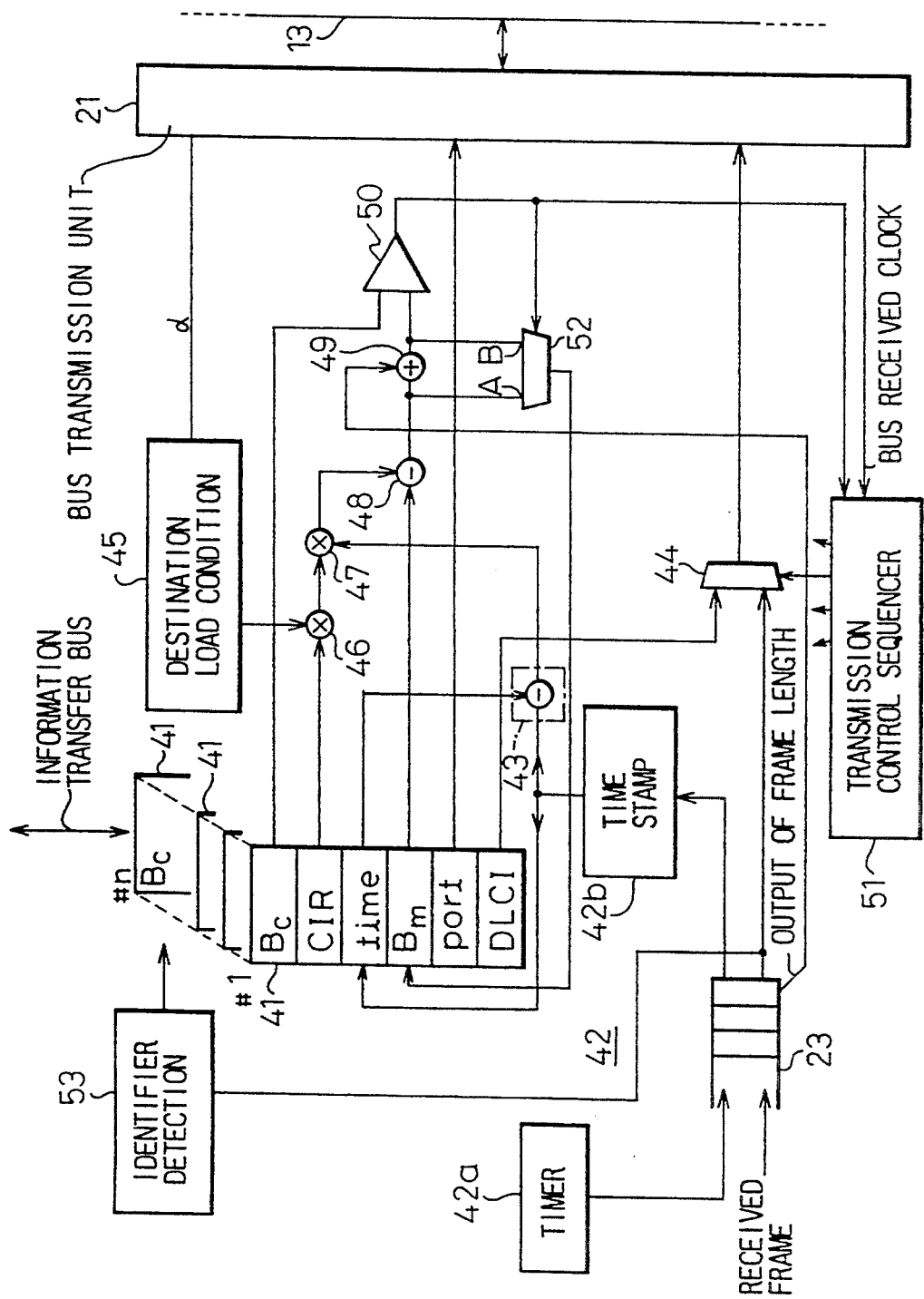
FIG. 21 is a view showing a concrete example of a utilization measuring unit.

FIG. 21 is a view showing a concrete example of the utilization measuring unit. Note that, the concrete example of the figure is based on the second embodiment already mentioned, but the structure in principle is exactly the same also for the case based on the already mentioned first embodiment.

Viewing this as a whole at first, the utilization measuring unit 25 includes a plurality of utilization-information tables 41 allotted for every PVC line and holding the use conditions under which each PVC line utilizes the related frame relay switching network; timer means 42 which are mounted in the input and output of the receiving buffer 23 for observing the already mentioned elapsed time, which is one of the types of information held in the utilization-information table 41; and a subtracter 43 which calculates the difference between the arrival time of the frame which arrived just before this time and is held in the area "time" of the utilization-information table 41 and the arrival time of the frame which arrives at present, observed by the timer means 42, detects a PVC (assigned connection) identifier attached to that frame when the frame is output from the receiving buffer 23, and selects a corresponding table from among a plurality of utilization-information tables 41. Note that, the timer means 42 is actually constituted by a timer 42a and a time stamp register 42b.

The above-described PVC identifier is attached to the header part of the received frame transmitted from the receiving buffer 23, this is monitored by the identifier detection unit 53, and to which PVC the received frame belongs is detected. This identifier is concretely referred to as a data link connection identifier (DLCI).

When it is assumed that DLCI is #1, the table 41 corresponding to #1 among a plurality of utilization-information tables 41 is referred to. That table 41 comprises an area in which the values of the already mentioned $B_c$ (or $B_e$) and CIR (or EIR) determined with respect to the PVC having the DLCI of #1 are held in a fixed manner ($B_c$ and CIR in the figure) and the already mentioned $B_m$ (stored amount of communication data at the present time) are rewritably held, an area holding the line number (port) of destination of the related PVC, and an area holding a new DLCI replaced when the related reception frame is further transferred. Note that, in this new DLCI, the selector 44 selects the upper side route in the figure at a timing of arrival of the header part of the related reception frame and rewrites that header part by the new DLCI.

The resultant decision of load condition of the destination line (limiting coefficient) is fetched into the destination load condition register 45 according to the already mentioned bus sequence. This limiting coefficient $\alpha$ is multiplied with CIR from the table 41 at the multiplier 46 and becomes $\alpha$.CIR. This $\alpha$.CIR corresponds to the "$\alpha$.EIR" of FIG. 7. Where the EIR is held in the table 41, the multiplication value becomes $\alpha$.EIR. Note, in the example of the figure, $B_c$ and CIR are held in the table 41.

The output of the multiplier 46 is multiplied with the difference of respective arrival times between the already mentioned preceding frame and following frames. Here, the virtual amount of communication data which is deemed to have been virtually transmitted, mentioned in already mentioned [2] can be calculated by $\alpha$.CIR, and that amount is subtracted from the stored amount of communication data $B_m$. This subtracter 48 outputs "0" when the result of subtraction becomes negative.

With respect to the output of this subtracter 48, one frame length's worth of currently received frame is added at the adder 49. The result of that addition is applied to the comparator 50 where it is compared with $B_c$ in magnitude. When it is smaller than $B_c$, the reception frame is transferred as it is conversely, if it is larger than $B_c$, this reception frame is discarded. At the discard operation, the read-out of the frame inside the receiving buffer 23 which was to be read out next is omitted. This is attained by skipping the read out pointer of the receiving buffer 23 by one via a transmission control sequencer 51.

Also, at that discard operation, the selector 52 selects the side of the input port A. When it is not discarded, it selects the side of the input port B. The area of $B_m$ in the table 41 is rewritten (renewed) according to the output of the selector 52, and therefore, when a discard operation occurs, the value at the stage before the adder 49 is fed back to the area $B_m$ of the table 41. When the discard operation does not occur, since the frame length is added, the value after that addition is fed back to the area $B_m$.

Figure 22:
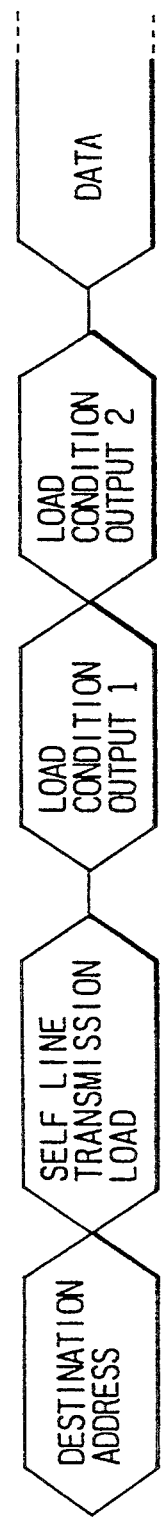
FIG. 22 is a view showing a bus sequence where various functions are further added to the bus sequence of FIG. 19.

FIG. 22 is a view showing the bus sequence where various functions are added to the bus sequence of FIG. 19. With respect to the bus sequence of FIG. 19, first the "self line transmission load" is added. This represents the procedure for transmitting the already mentioned congestion notification in an opposite direction, that is, the notification is attached to the transmission frame.

Also, the "load condition output" in the bus sequence of FIG. 19 is indicated as the "load condition output 1" and "load condition output 2" in the figure. The load condition output 1 represents the limiting coefficient $\alpha$ serving as the decision criterion of the frame discard operation; and the load condition output 2 represents the limiting coefficient $\alpha'$ serving as the decision criterion of whether or not the congestion notification should be issued.

Figure 23:
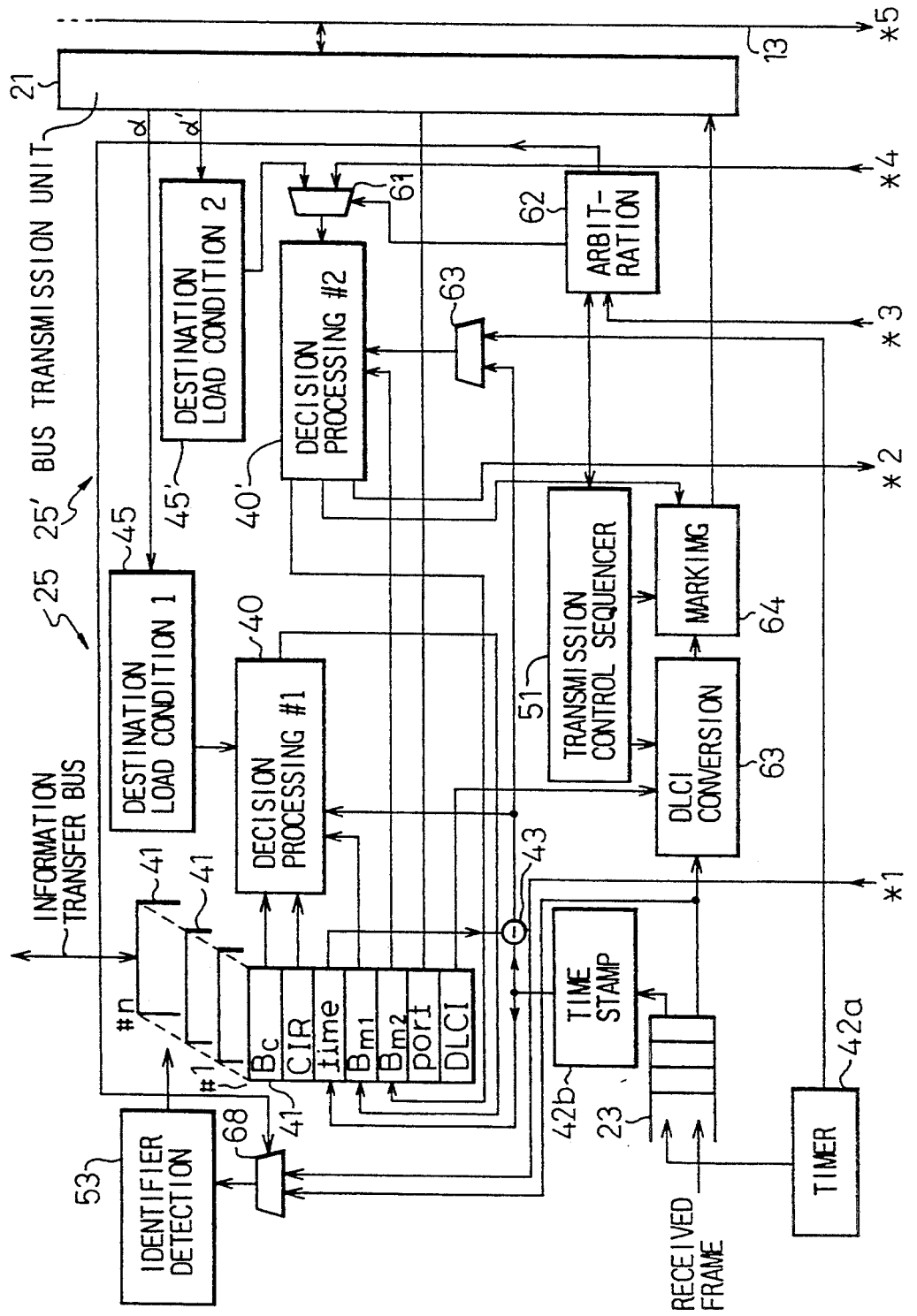
FIG. 23 is a view showing a concrete example of the line accommodation unit where it further has a second utilization measuring unit (part 1)
Figure 24:
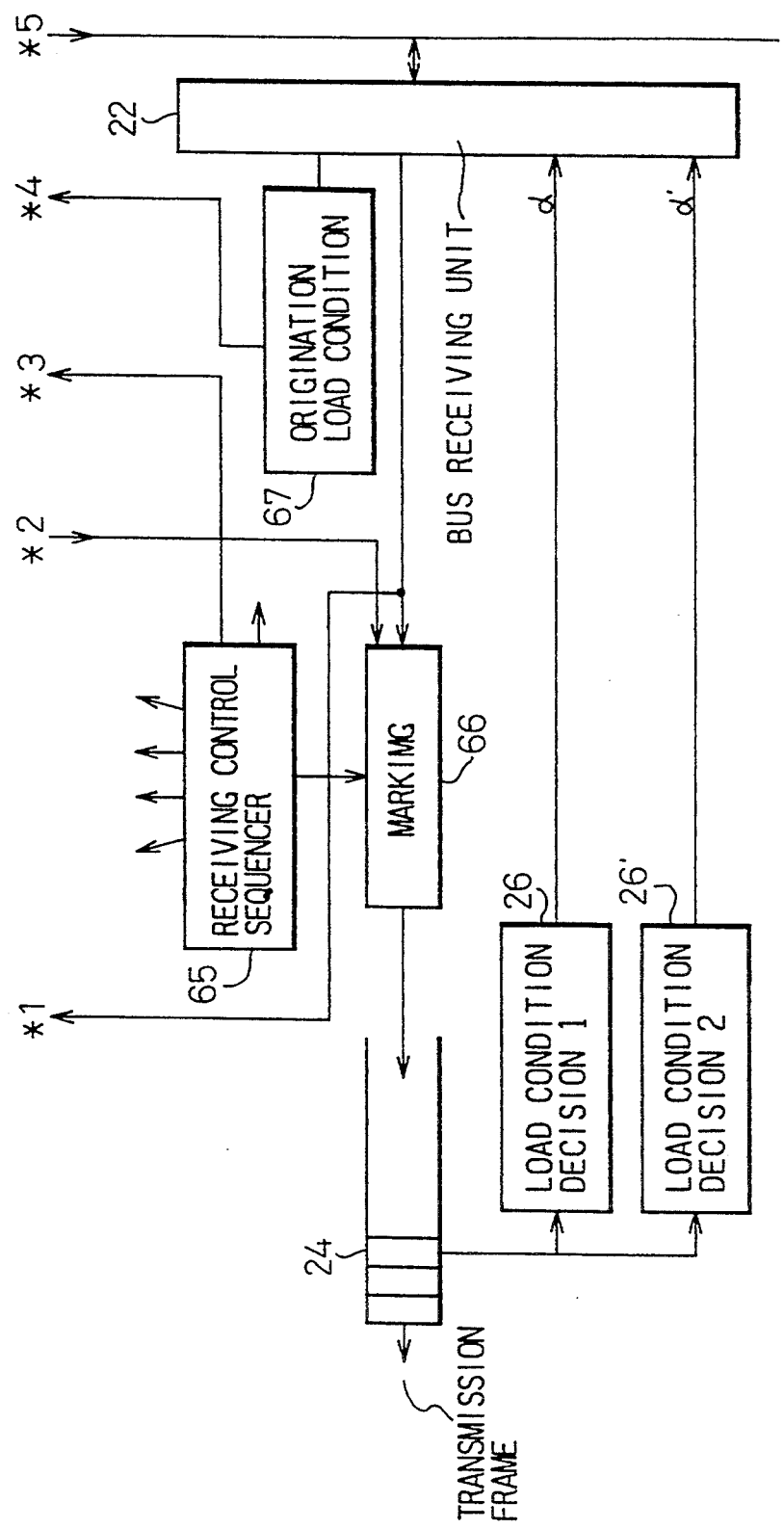
FIG. 24 is a view showing a concrete example of the line accommodation unit where it further has the second utilization measuring unit (part 2)

FIG. 23 and FIG. 24 are views showing a concrete example of the line accommodation unit where it further has a second utilization measuring unit. In these figures, a second utilization measuring unit 25' identical to the utilization measuring unit 25 is further provided. The second utilization measuring unit 25' judges that the related PVC line is in the congestion state based on the amount of communication data taking the second limiting coefficient $\alpha'$ applying a weaker limitation than the limiting coefficient $\alpha$, into consideration. It marks that congestion notification in the transmission and reception frames passing through the related line accommodation unit 12. The marking with respect to the reception frame flowing in the normal direction (downstream) is carried out at the congestion notification marking unit 64. Note that, the DLCI conversion unit 63 at the stage before the same has a function identical to the selector 44 of FIG. 21. The timing etc. of this marking are controlled by the transmission control sequencer 51.

On the other hand, the marking with respect to the transmission frame flowing in an opposite direction (upstream) is carried out at the congestion notification marking unit 66. The timing of that marking etc. are controlled by the receiving control sequencer 65.

The marking in the opposite direction described above (goes toward another frame relay exchange apparatus 2') and the marking in the normal direction are carried out at the timings indicated by "self line transmission load" and "load condition output 2" in FIG. 22, respectively.

Also, the load condition of the destination line (second limiting coefficient $\alpha'$ for determining whether or not the congestion notification can be transmitted) is fetched into the destination load condition register 45'. This $\alpha'$ is input to the second decision processing unit (#2) 40' via the selector 61, and the predetermined computation is carried out. Also this second decision processing unit (#2) 40' and the decision processing unit (#1) on the left side thereof in the figure have almost the same structure. The detailed structure is almost the same as the decision processing circuit comprising the constituent elements 46, 47, 48, 49, 50 and 52.

The above-described selector 61 has an identical role to that of the selector 63 shown beneath the second decision processing unit (#2) 40' in the figure. Namely, the second decision processing unit (#2) 40' performs the decision of frames for both of the normal direction and opposite direction at two different timings, unlike the decision processing unit 40 performing the decision only for the normal direction frame, and performs the above-described marking, and therefore performs the switching of these two different timings. The first timing is at the time of normal direction decision, and the second timing is at the time of decision of the opposite direction. The timing arbitration unit 62 receives the command from the transmission/receiving control sequencers 51 and 65 and controls the switching thereof.

At the first timing performing the decision of the normal direction, the selector 61 fetches the content ($\alpha'$) of the destination load condition register 45' into the second decision processing unit (#2), and the selector 63 selects the output of the subtracter 43.

At the second timing performing the decision of the opposite direction, the selector 61 fetches the content ($\alpha'$) of the origination load condition register 67 (FIG. 24) into the second decision processing unit (#2) 40', and the selector 63 inputs the present time (time at which the transmission frame in the opposite direction passes through the related line accommodation unit 12) read from the timer 42a to the second decision processing unit (#2) 40'.

The second decision processing unit (#2) 40' takes a value different from that of the first decision processing unit (#1) 40 for the already mentioned elapsed time, and therefore also the already mentioned stored amount of communication data ($B_m$) becomes different between the processing unit 40 and the processing unit 40'. For this reason, the area inside the table 41 is sectioned to $B_{m1}$ and $B_{m2}$.

Also, when one among a plurality of tables 41 is selected by the identifier detection unit 53, a distinction must be made between the case were the reception frame in the normal direction is handled and the case where the transmission frame in the opposite direction is handled, and therefore the selector 68 is mounted.

The part supplying $\alpha'$ to the origination load condition register 67 (FIG. 24) is the second utilization measuring unit (25') existing in one line accommodation unit in another frame relay exchange apparatus 2' using the illustrated related line accommodation unit 12 as the frame destination. Also with respect to the utilization measuring units (25 and 25') existing in the line accommodation unit in this frame relay exchange apparatus 2', the load condition ($\alpha$ for determining the discard and $\alpha'$ for decision of the congestion notification) in the illustrated related line accommodation unit must be transmitted. For this purpose, the first load condition decision unit 26 and the second load condition decision unit 26' are mounted. Note, it is also possible to realize them by arranging the same in one ROM.

The above-mentioned utilization measuring units (25, 25') can be provided in respective line accommodation units 12 inside the frame relay exchange apparatus 2 individually. However, the structures of the utilization measuring units are the same for all of the line accommodation units, and therefore it is more economical in a case where a plurality of line accommodation units 12 commonly use one utilization measuring unit in a time division mode.

Figure 25:
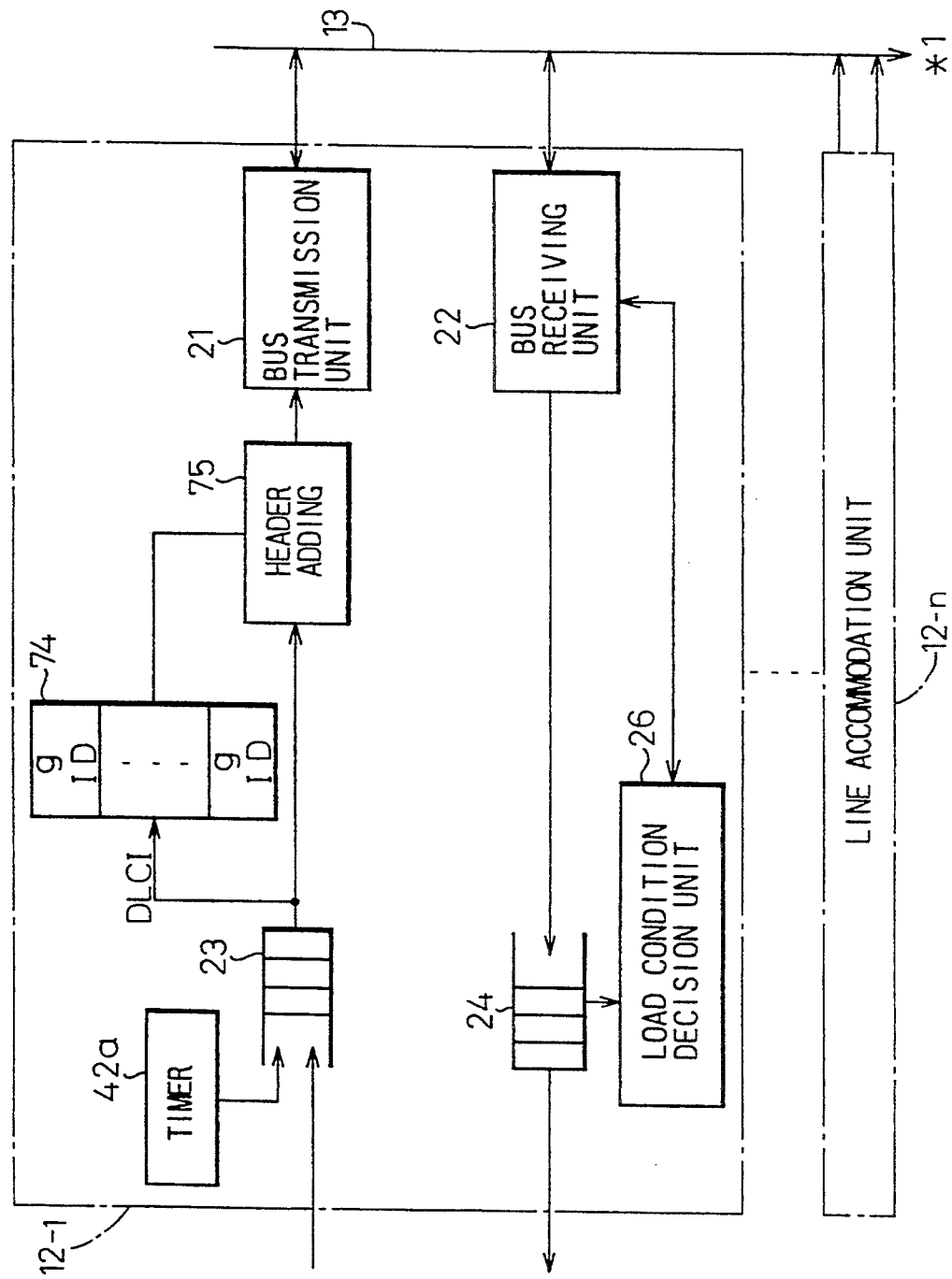
FIG. 25 is a view showing a structural example when the utilization measuring unit is shared (part 1)
Figure 26:
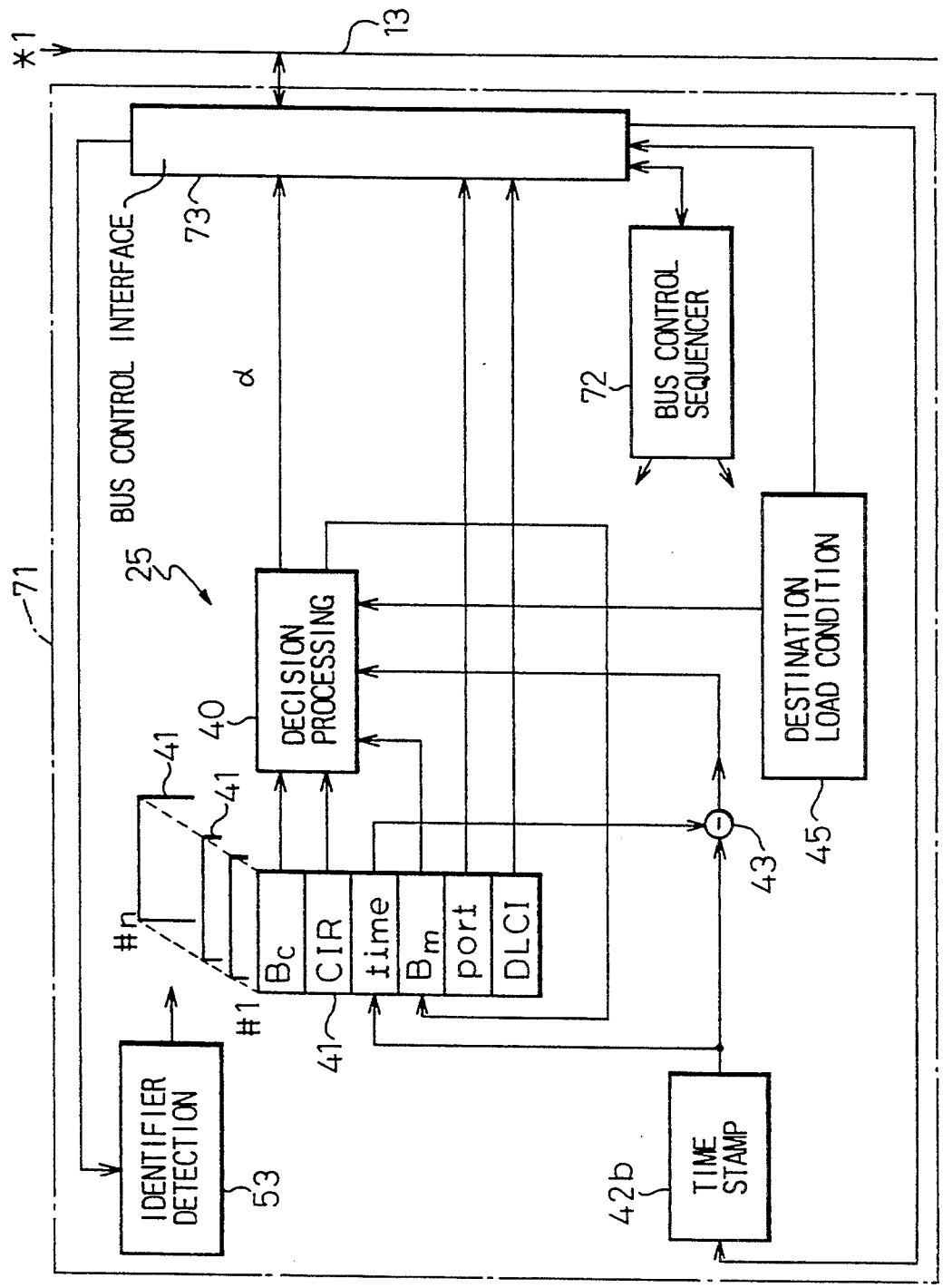
FIG. 26 is a view showing a structural example when the utilization measuring unit is shared (part 2)

FIG. 25 and FIG. 26 are views showing an example of the construction for sharing the utilization measuring unit. The point of this example resides in that the utilization measuring unit 25 is included, and a common utilization measuring unit 71 commonly used is possessed by a plurality of line accommodation units 12 (12-1, ..., 12-n) via the common bus 13. Note that, the internal structure will be concretely shown only for the line accommodation unit 12-1. This is because an identical structure is adopted also for the other line accommodation units. Note, only the structure of principal part will be shown.

So as to achieve common use by one utilization measuring unit 71, the following two points must be noted. The first point is that the access of the common bus 13 must be allocated corresponding to respective line accommodation units. For this purpose, a bus control sequencer 72 (FIG. 26) and bus control interface 73 performing the control of bus access right are necessary.

The second point is that the values of the already mentioned DLCI's sometimes casually coincide between different line accommodation units. A malfunction due to this coincidence must be eliminated. For this reason, an identifier conversion unit 74 (FIG. 25) is provided inside each line accommodation unit 12. This identifier conversion unit 74 converts the identifiers (DLCI) of various types of PVC's treated by the respective line accommodation units to various types of global identifiers (g-ID: global- ID). These global identifiers are prepared in advance for every frame relay exchange apparatus 2. In this apparatus 2, the set-up is made so that two identical .global identifiers will not exist. Accordingly, to the identifier detection unit 53 inside the common utilization measuring unit 71, the above-described global identifier (g-ID) converted for every reception frame is input. This g-ID is attached to the respective reception frames at the header adding unit 75 (FIG. 25).

Figure 27:
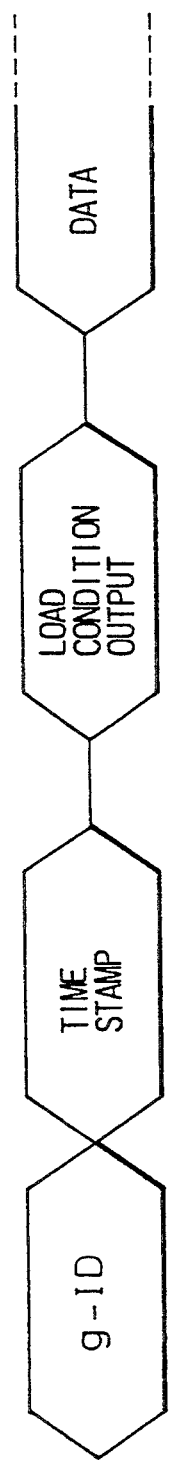
FIG. 27 is a view showing a bus sequence corresponding to the structures of FIG. 25 and FIG. 26.

FIG. 27 is a view showing the bus sequence corresponding to the structures of FIG. 25 and FIG. 26. Basically it resembles to the bus sequence shown in FIG. 19. The "destination address" of FIG. 19 is replaced by the above-described "g-ID". Also, the frame arrival time (by the timer 12a) for every line accommodation unit must be transmitted as the "time stamp" to the common utilization measuring unit 71 via the common bus 13.

Figure 28:
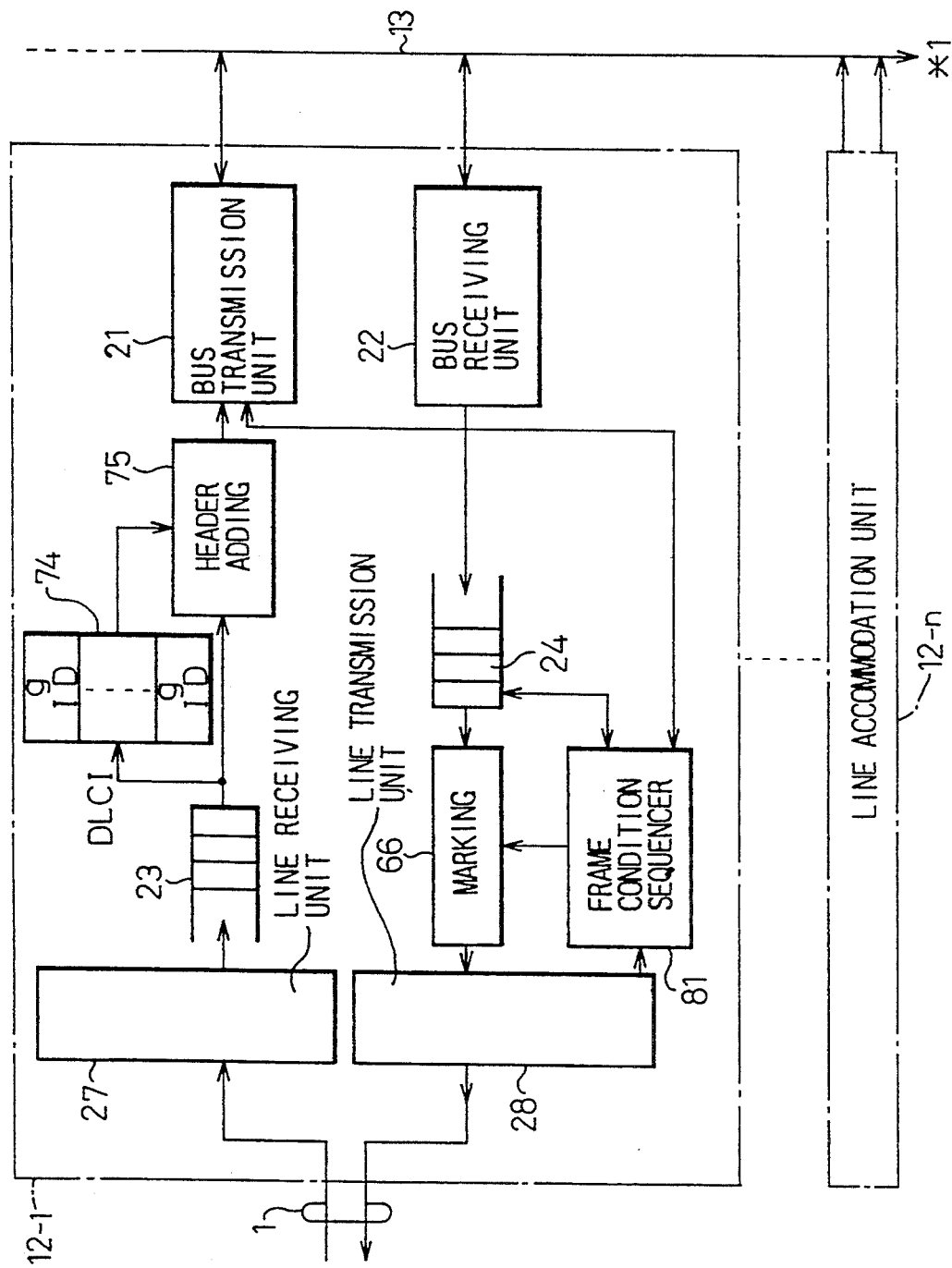
FIG. 28 is a view showing a structural example wherein the second utilization measuring unit is further shared (part 1)
Figure 29:
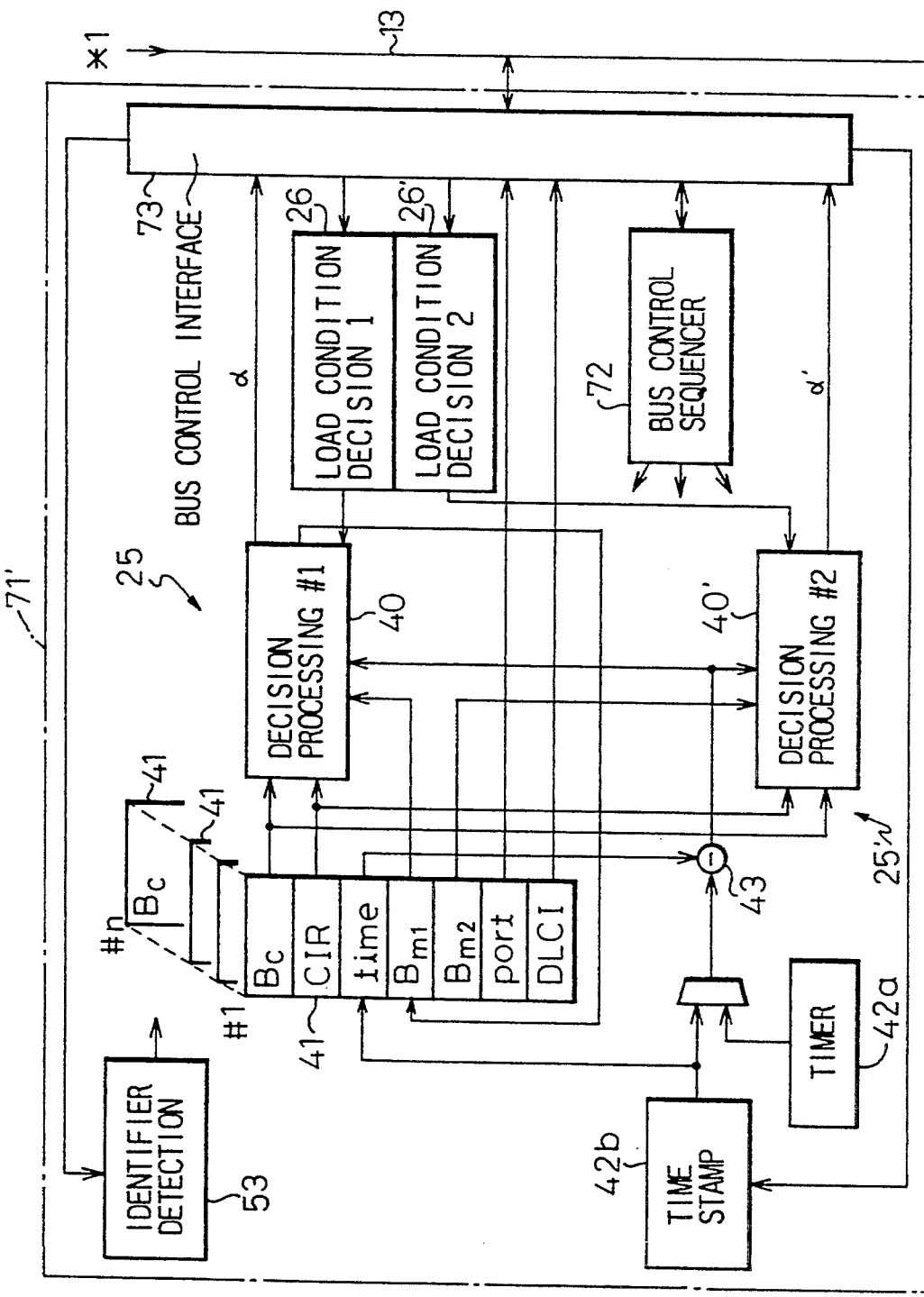
FIG. 29 is a view showing a structural example wherein the second utilization measuring unit is further shared (part 2).

FIG. 28 and 29 are views showing the structural example further commonly using the second common utilization measuring unit. The point of this structural example is that the utilization measuring unit 25 and the second utilization measuring unit 25' are included, and by a plurality of line accommodation units 12 (12-1, ..., 12-n), the second common utilization measuring unit 71' commonly used is possessed via the common bus 13. The same reference numerals or symbols are attached to the constituent elements identical to those already explained.

Where the congestion notification is carried out, if the holding time at the transmission buffer 24 is long, the real time property of this congestion notification is lost. So as to hold this real time property, it is necessary to perform the congestion notification decided under the situation at the point of time of taking the transmission frame out of the transmission buffer 24 and sending the same.

For this purpose, at the time at which the frame is sent from the transmission buffer 24 to the line, first the common bus 13 is accessed, and a necessary parameter (g-ID, etc.) is supplied to the second common utilization measuring unit 71'. That is, the computation at the second utilization measuring unit 71' for performing the marking of the congestion notification with respect to the respective frames is executed at the point of time where the related frame is output from the transmission buffer 24. In this case, also the timer 42a which is both the timer means and the time stamp register 42b is accommodated in the second common utilization measuring unit 71' (FIG. 29). When there occurs a necessity of congestion notification with respect to the frame in an opposite direction, the marking of that notification (refer to 66 of FIG. 24) is carried out at the stage before the line transmission unit 28. Reference numeral 81 is a frame condition sequencer. When a command for issuing the congestion notification is received from the second common utilization measuring unit 71' via the common bus 13, it performs the above-described marking. Also, the sequencer 81 sends the number of stored bytes in the buffer 24 to the load condition decision units 26 and 26'.

In the above-described operation, the common bus 13 can not be accessed at any timing, and the buffer processing must be carried out only during the waiting time until the bus accessing right is obtained (not constant). The time of this buffer processing is sufficiently short in comparison with an average storage time at the transmission buffer 24, and there occurs no problem.

Also, an example of the bus sequence was indicated in various ways, but if a plurality of common buses 13 are provided in parallel, the transfer of desired information can be completed in a single cycle.

Furthermore, when the communication sequence of the various types of information (g-ID, $\alpha$, $\alpha'$ time stamp, etc.) preceding the frame transfer is executed by using a sub-bus separated from the main bus for the frame transfer, an overhead time between the continuous frame transfer and frame transfer can be shortened, and the frame switching processing time can be further shortened.

Note that, an explanation was made of the frame relay PVC, but it is possible to obtain the same effects by applying the present invention when the connection is set up even by a virtual call (VC) which is set up in accordance with the request from the subscriber.

As explained above, according to the present invention, communication is limited starting with the PVC performing communication exceeding the range of the original terms of subscription of communication with a high priority while utilizing the resources inside the switching network at the maximum level. Accordingly it is possible to avoid unjust limitations of the other PVC's performing communication within their range by the above-described PVC.

Moreover, it is also possible to perform the congestion processing based on the present invention with software by a host computer provided for each frame relay exchange apparatus, but the congestion processing can be greatly enhanced in the operation speed by executing the same using a congestion processing circuit built by the hardware disclosed in the present invention.

I claim:

1. A congestion processing mode in a frame relay exchange apparatus which accommodates a plurality of subscriber lines and relay lines and transmits frames received from these lines to destination lines, wherein
an amount of communication data of each assigned connection is individually measured along with an elapsed time;
at a point of time when each of said frames received from said subscriber lines and relay lines is subjected to switching processing in said frame relay exchange apparatus, a coefficient for limiting the amount of communication data, and determined in accordance with the magnitude of the load of a network resource utilized by a connection to which the related frame belongs, is calculated along with an elapsed time;
based on the aforesaid measured amount of communication data, said limiting coefficient is multiplied with the upper limit value of an acceptable amount of communication data for each assigned connection detected to perform a communication exceeding the upper limit value of the acceptable amount of communication data which is determined in advance for each assigned connection, and it is decided whether to discard said frame belonging to the related assigned connection or give notification that it exists in the congested state based on that limited upper limit value.

2. A congestion processing mode in a frame relay exchange apparatus as set forth in claim 1, wherein said upper limit value of said acceptable amount of communication data determined in advance for every assigned connection is determined by an excessive burst amount ($B_e$) and, further, the amounts of communication data of said frames transferred onto each assigned connection within a constant period are cumulatively added, whereby the amount of communication data for every assigned connection is measured.

3. A congestion processing mode in a frame relay exchange apparatus as set forth in claim 2, wherein two different types of a first upper limit value and second upper limit value are set as said upper limit values of said acceptable amount of communication data determined in advance for every assigned connection, said first upper limit value is determined by said excessive burst amount, and said second upper limit value is determined by the committed burst amount ($B_c$).

4. A congestion processing mode in a frame relay exchange apparatus as set forth in claim 1, wherein said upper limit value of said acceptable amount of communication data determined in advance for every aforesaid assigned connection is determined using the excessive information rate as the criterion and, at the same time, the amount of communication data for every assigned connection is measured using the difference between the cumulative amount of communication data cumulatively added every time when the aforesaid frame arrives and the virtual amount of communication data deemed to have been transmitted through every aforesaid assigned connection along with an elapsed time.

5. A congestion processing mode in a frame relay exchange apparatus as set forth in claim 4, wherein two different types of the first upper limit value and the second upper limit value are set as the aforesaid upper limit values of the aforesaid acceptable amount of communication data determined in advance for every aforesaid assigned connection, said first upper limit value is determined using the aforesaid excessive information rate as the criterion, and said second upper limit value is determined using the committed information rate as the criterion.

6. A congestion processing mode in a frame relay exchange apparatus as set forth in claim 1, wherein said network resource is the destination line of said frame, and, as said limiting coefficient, use is made of a value respectively set large or small in accordance with the degree of the queue length of the transmission queue provided in that line.

7. A congestion processing mode in a frame relay exchange apparatus as set forth in claim 1, wherein said network resource is the destination line of said frame, and, as said limiting coefficient, use is made of a value respectively set large or small in accordance with the degree of the queue length of the transmission queue set in that line, and further set to a different value in accordance with the transmission rate of that line.

8. A congestion processing circuit in a frame relay exchange apparatus which accommodates a plurality of subscriber lines and relay lines and transmits frames received from these lines to destination lines, wherein
the aforesaid frame relay exchange apparatus comprises a plurality of line accommodation units corresponding to said subscriber lines and relay lines and a common bus inter-connecting these line accommodation units;
each said line accommodation unit includes a bus transmission unit outputting the frames to the aforesaid common bus, a bus receiving unit receiving as its input the aforesaid frames from said common bus, a receiving buffer which temporarily stores the aforesaid frames received from a corresponding aforesaid line and outputs the same to said bus transmission unit, and a transmission buffer which temporarily stores said frames input via said bus receiving unit and transmits the same to the corresponding aforesaid line; and
wherein said congestion processing circuit comprises a utilization measuring unit which monitors said frame output from said receiving buffer, individually measures the amount of communication data for each assigned connection along with an elapsed time, calculates said amount of communication data taking a limiting coefficient set in accordance with the magnitude of the transmission load of the aforesaid line accommodation unit corresponding to the destination line of said frame into consideration, and controls the transmission of the aforesaid frame from said bus transmission unit in accordance with that calculated amount of communication data; and
a load condition decision unit which monitors the amount of communication data of the aforesaid frame input and output to and from said transmission buffer, generates said limiting coefficients, and supplies that generated limiting coefficient via the aforesaid common bus to said utilization measuring unit mounted in another one of the line accommodation units which unit is to be connected as the destination line with the related line accommodation unit.

9. A congestion processing circuit as set forth in claim 8, wherein said load condition decision unit holds various types of said limiting coefficients corresponding to the amount of communication data stored in the said transmission buffer as tables.

10. A congestion processing circuit as set forth in claim 8, wherein the aforesaid utilization measuring unit includes
utilization-information tables allotted for every aforesaid assigned connection, holding the use condition where each said assigned connection utilizes the related frame relay switching network,
a timer means which is arranged at the input and output of the aforesaid receiving buffer for observing the aforesaid elapsed time which is one of the types of information held in the aforesaid utilization-information table; and
a subtracter which calculates the difference between the arrival time of the aforesaid frame arriving immediately before this time held in the aforesaid utilization-information tables and the arrival time of the aforesaid frame which now arrives, observed by said timer means, and
when the aforesaid frame is output from the aforesaid receiving buffer, the assigned connection identifier attached to said frame is detected to select a corresponding table from among the aforesaid plurality of utilization-information tables.

11. A congestion processing circuit as set forth in claim 8, wherein provision is further made of a second utilization measuring unit identical to the aforesaid utilization measuring unit; said second utilization measuring unit decides that the related assigned connection is in the congestion state based on the aforesaid amount of communication data taking the second limiting coefficient applying a weaker limitation than that of the aforesaid limiting coefficient into consideration, and marks that congestion notification in the transmission and reception frames passing through the related line accommodation unit.

12. A congestion processing circuit as set forth in claim 11, wherein a common utilization measuring unit is mounted which includes the aforesaid utilization measuring unit and is commonly used via the aforesaid common bus by a plurality of aforesaid line accommodation units.

13. A congestion processing circuit as set forth in claim 12, wherein an identifier conversion table is provided for converting an assigned connection identifier inside each aforesaid line accommodation unit, which table reconverts each said converted assigned connection identifier to mutually different set-up connection identifiers so that the assigned connection identifiers of the reception frames input to said frame relay exchange apparatus do not coincide with each other, and access to the aforesaid common utilization measuring unit is carried out by said converted identifier.

14. A congestion processing circuit as set forth in claim 11, wherein a second common utilization measuring unit is mounted which includes both the aforesaid utilization measuring unit and the aforesaid second utilization measuring unit and is commonly used via the aforesaid common bus by a plurality of aforesaid line accommodation units.

15. A congestion processing circuit as set forth in claim 13, wherein an identifier conversion table is provided for converting an assigned connection identifier inside each aforesaid line accommodation unit, which table reconverts each said converted assigned connection identifier to mutually different assigned connection identifiers so that the assigned connection identifiers of the reception frames input to said frame relay exchange apparatus do not coincide with each other, and access to the aforesaid second common utilization measuring unit is carried out by said converted identifier.

16. A congestion processing circuit as set forth in claim 11, wherein the computation at the aforesaid second utilization measuring unit for performing the marking of the aforesaid congestion notification with respect to each the aforesaid frame is executed at the point of time when the related frame is output from the aforesaid transmission buffer.

* * * * *